United States Patent
Huh et al.

(10) Patent No.: US 11,177,759 B2
(45) Date of Patent: Nov. 16, 2021

(54) SYSTEM AND METHOD FOR SELF-SENSING OF ELECTRIC MACHINES AND REDUCTION OF NOISE AND VIBRATION ASSOCIATED THEREWITH

(71) Applicant: General Electric Company, Schenectady, NY (US)

(72) Inventors: Kum-Kang Huh, Niskayuna, NY (US); Yukai Wang, Schenectady, NY (US); Nidhishri Tapadia, Arvada, CO (US); Di Pan, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 16/698,622

(22) Filed: Nov. 27, 2019

(65) Prior Publication Data
US 2020/0169212 A1    May 28, 2020

Related U.S. Application Data

(60) Provisional application No. 62/772,130, filed on Nov. 28, 2018.

(51) Int. Cl.
  *H02P 27/08*   (2006.01)
  *H02P 21/18*   (2016.01)
  *H02P 21/22*   (2016.01)
(52) U.S. Cl.
  CPC ............ *H02P 27/085* (2013.01); *H02P 21/18* (2016.02); *H02P 21/22* (2016.02)

(58) Field of Classification Search
  CPC .......... H02P 27/12; H02P 21/18; H02P 21/22; H02P 6/185
  See application file for complete search history.

(56) References Cited

U.S. PATENT DOCUMENTS 5,565,752 A   10/1996   Jansen et al.
5,585,709 A   12/1996   Jansen et al.
(Continued)

OTHER PUBLICATIONS

Bianchi et al., "Effect of Stator and Rotor Saturation on Sensorless Rotor Position Detection," IEEE Transactions on Industry Applications, vol. 49, No. 3, pp. 1333-1342, May/Jun. 2013.
(Continued)

*Primary Examiner* — Said Bouziane
(74) *Attorney, Agent, or Firm* — Ziolkowski Patent Solutions Group, SC; Jean K. Testa

(57) ABSTRACT

A drive system for driving an AC electric machine includes an electric machine power converter that provides a primary current excitation vector having a magnitude and angle to drive the AC electric machine. A control system separate from or incorporated into the power converter causes the power converter to inject a carrier signal to the AC electric machine that is superimposed onto the current vector and that generates a carrier response signal that has sensitivity to magnetic alignment information of the AC electric machine at its operating point, the carrier response signal providing a measurable magnetic alignment signature of the AC electric machine. The control system causes the power converter to inject the carrier signal at an injection angle between a constant flux injection angle and a constant torque injection angle, to reduce noise and/or vibration of the AC electric machine caused by the injected carrier signal.

23 Claims, 26 Drawing Sheets

(56) References Cited

U.S. PATENT DOCUMENTS

| | | | |
|---|---|---|---|
| 6,058,596 A | 5/2000 | Jansen et al. | |
| 6,069,467 A | 5/2000 | Jansen | |
| 6,137,258 A * | 10/2000 | Jansen | H02P 6/185 |
| | | | 318/802 |
| 6,388,420 B1 | 5/2002 | Jansen et al. | |
| 6,456,908 B1 | 9/2002 | Kumar | |
| 6,515,395 B1 | 2/2003 | Jansen | |
| 6,789,028 B2 | 9/2004 | Dragomir-Daescu et al. | |
| 6,874,221 B2 | 4/2005 | Jansen et al. | |
| 8,159,161 B2 | 4/2012 | Tomigashi | |
| 9,093,878 B2 | 7/2015 | Huh et al. | |
| 2008/0048599 A1 | 2/2008 | Ho | |
| 2010/0045218 A1* | 2/2010 | Tomigashi | H02P 6/183 |
| | | | 318/400.02 |
| 2010/0301790 A1 | 12/2010 | Liu et al. | |
| 2014/0117791 A1 | 5/2014 | Fiseni et al. | |
| 2015/0084471 A1 | 3/2015 | Huh et al. | |
| 2015/0295454 A1 | 10/2015 | El-Refaie et al. | |
| 2016/0105064 A1 | 4/2016 | Huh et al. | |
| 2020/0099323 A1* | 3/2020 | Luedtke | H02P 21/22 |
| 2020/0169204 A1* | 5/2020 | Lakshmi Narasimha | H02P 21/22 |
| 2020/0366228 A1* | 11/2020 | Sul | H02P 21/05 |

OTHER PUBLICATIONS

Corley et al., "Rotor Position and Velocity Estimation for a Permanent Magnet Synchronous Machine at Standstill and High Speeds," Conference Proceedings of IEEE Industry Application Society Annual Meeting, San Diego, CA, pp. 36-41, Oct. 6-10, 1996.

* cited by examiner (b) 100% CURRENT

SYSTEM AND METHOD FOR SELF-SENSING OF ELECTRIC MACHINES AND REDUCTION OF NOISE AND VIBRATION ASSOCIATED THEREWITH

CROSS-REFERENCE TO RELATED APPLICATIONS

The present invention claims priority to U.S. Provisional Patent Application Ser. No. 62/772,130, filed Nov. 28, 2018, the disclosure of which is incorporated herein by reference in its entirety.

BACKGROUND OF THE INVENTION

Embodiments of the invention relate generally to electric machines and, more particularly, to a self-sensing method for an electric machine whereby a carrier signal is injected is controlled in order to reduce noise and vibration in operating the electric machine.

The usage of electric machines in various industries has continued to become more prevalent in numerous industrial, commercial, and transportation industries over time. With an electric machine, be it an interior electric machine (IPM) machine, permanent magnet (PM) assisted synchronous reluctance machine, or a synchronous reluctance machine, position determination of the rotor or the magnetic field is a critical informational element for torque control of the machine.

For purposes of determining rotor position in an electric machine, an encoder, tachometer, or resolver may be used as the position sensor. For measuring the magnetic field position in the electric machine, magnetic field sensors such as Hall effect sensors may be used. The sensors/devices utilized for determining the rotor position and magnetic field may be used in combination with one another, with it being recognized that position sensor or rotor position sensors and magnetic field sensors for measuring magnetic field orientation or strength may both be employed for the purpose of electric machine control. It is recognized, however, that the position sensor (e.g., encoder), along with its cabling and interface electronics, contributes to a significant portion of the motor drive system cost and overall complexity and is often a major reliability concern. The cost, complexity, and reliability issues associated with the use of position sensors in determining rotor position has led to the advent of systems and methods of sensorless position sensing and control of electric machines (i.e., not requiring rotor position or speed sensors). Because of the tremendous potential of cost reduction and reliability improvement, sensorless control has been a major research challenge. Most of the sensorless control methods that are available in industries are so called Back-EMF tracking approaches. Back-EMF tracking methods utilize the voltage of the motor winding induced by the time variation of the flux-linkage caused by the rotation of the rotor. These methods perform very well near the rated speed where the back-EMF voltage is close to rated voltage. However, as the speed is reduced, the back-EMF magnitude is reduced and performance is deteriorated. Eventually, as the speed is close to zero, these methods become unstable and fail, because the back-EMF diminishes and becomes unobservable.

Owing to its tremendous potential of cost reduction, reliability improvement, and elimination of interfaces, zero and near zero speed (or frequency) sensorless control has been a major research challenge for decades, and high frequency injection methods have been the most promising solution for the sensorless operation on or near zero frequency for AC electric machines with saliency. High frequency signal injection is used to track the rotor angular position and velocity of various AC electric machines having a rotor providing an impedance that varies with rotor position or flux position. In employing a high frequency signal injection technique, small signal saliency (i.e., as a measure of q-axis inductance and d-axis inductance) and/or other magnetic alignment signatures may to analyzed for implementing the sensorless control.

However, with respect to previously employed self-sensing operation that employ high frequency injection, it is recognized such high frequency injection may undesirably increase noise and vibration in operating the electric machine. That is, as indicated above, existing sensorless control technology injects a carrier signal majorly along a minimum or maximum inductance orientation, and it is recognized that a carrier signal injection aligned with this orientation typically generates significant noise. Additionally, vibration can be generated from torsional excitation as well as radial excitation, with torsional excitation and associated vibration being high when the signal injection orientation is aligned along the constant flux orientation (at a constant radial force)—i.e., a flux contour—and with radial excitation and associated vibration being high when the signal injection orientation is aligned along the constant torque orientation—i.e., torque contour. Thus, considering that the injection signal concentrates on a narrow audible range, it may thus limit sensorless control in some applications.

Therefore, it is desirable to provide a system and method for self-sensing of an electric machine that utilizes high frequency carrier signal injection while still reducing or minimizing noise and vibration in operating the electric machine. This system and method for self-sensing would reduce/minimize noise and vibration in operating the electric machine while still providing a desired level of self-sensing performance, so as to not compromise controlling of the machine.

BRIEF DESCRIPTION OF THE INVENTION

In accordance with one aspect of the invention, a drive system for driving an AC electric machine includes an electric machine power converter configured to provide a primary current excitation to drive the AC electric machine and inject a carrier signal to the AC electric machine, the primary current excitation comprising a current vector having a magnitude and angle. The drive system also includes a control system separate from or incorporated into the electric machine power converter, the control system commanding the power converter to inject a carrier signal to the AC electric machine that is superimposed onto the current vector, where the carrier signal generates a carrier response signal that has sensitivity to magnetic alignment information of the AC electric machine at its operating point, with the carrier response signal providing a measurable magnetic alignment signature of the AC electric machine. In injecting the carrier signal, the control system commands the power converter to inject the carrier signal at an injection angle between a constant flux injection angle and a constant torque injection angle, so as to reduce at least one of noise and vibration of the AC electric machine caused by the injected carrier signal.

In accordance with another aspect of the invention, a method for reducing a noise level of an AC electric machine is provided. The method includes causing a drive system to generate a primary current excitation to drive the AC electric machine, the primary current excitation comprising a current vector having a current magnitude and current angle and causing the drive system to superimpose a high-frequency carrier voltage or current onto the current vector to generate a selected carrier response current or voltage, respectively, that has sensitivity to magnetic alignment information of the AC electric machine. Causing the drive system to superimpose the high-frequency carrier voltage or current further comprises injecting the high-frequency carrier voltage or current at an orientation between a constant torque injection orientation and a constant flux injection orientation, so as to reduce the noise and/or vibration level of the AC electric machine below noise and/or vibration levels corresponding to injection of the high-frequency carrier voltage or current at the constant torque injection orientation and the constant flux injection orientation.

In accordance with yet another aspect of the invention, a drive system for driving an AC electric machine includes an electric machine power converter configured to generate a primary excitation current vector to drive the AC electric machine and inject a carrier signal onto the primary excitation current vector, the primary excitation current vector having a current magnitude and current angle. The drive system also includes a control system configured to cause the power converter to inject a carrier signal onto the primary excitation current vector, the carrier signal comprising one of a carrier voltage and a carrier current that is superimposed on the primary excitation current vector. The control system is also configured to measure at least one magnetic alignment signature of the AC electric machine that is derived from a carrier response signal generated from the injected carrier signal and control an orientation of the primary excitation current vector using the measured at least one magnetic alignment signature to operate the AC electric machine. In causing the power converter to inject the carrier signal, the control system is further configured to control at least one of an angle and frequency of the carrier signal to maintain a noise level associated with operation of the AC electric machine at less than a pre-determined decibel level.

In accordance with still another aspect of the invention, a drive system for driving an AC electric machine includes an electric machine power converter configured to provide a primary current excitation to drive the AC electric machine and inject a carrier signal to the AC electric machine, the primary current excitation comprising a current vector having a magnitude and angle. The drive system also includes a control system separate from or incorporated into the electric machine power converter, the control system commanding the power converter to inject the carrier signal to the AC electric machine that is superimposed onto the current vector, where the carrier signal generates a carrier response signal that has sensitivity to magnetic alignment information of the AC electric machine at its operating point, with the carrier response signal providing a measurable magnetic alignment signature of the AC electric machine. In commanding the power converter to inject the carrier signal, the drive system is configured to determine an injection angle that minimizes at least one of noise and vibration of the AC electric machine caused by the injected carrier signal and command the power converter to inject the carrier signal at the injection angle.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Figure 1A:
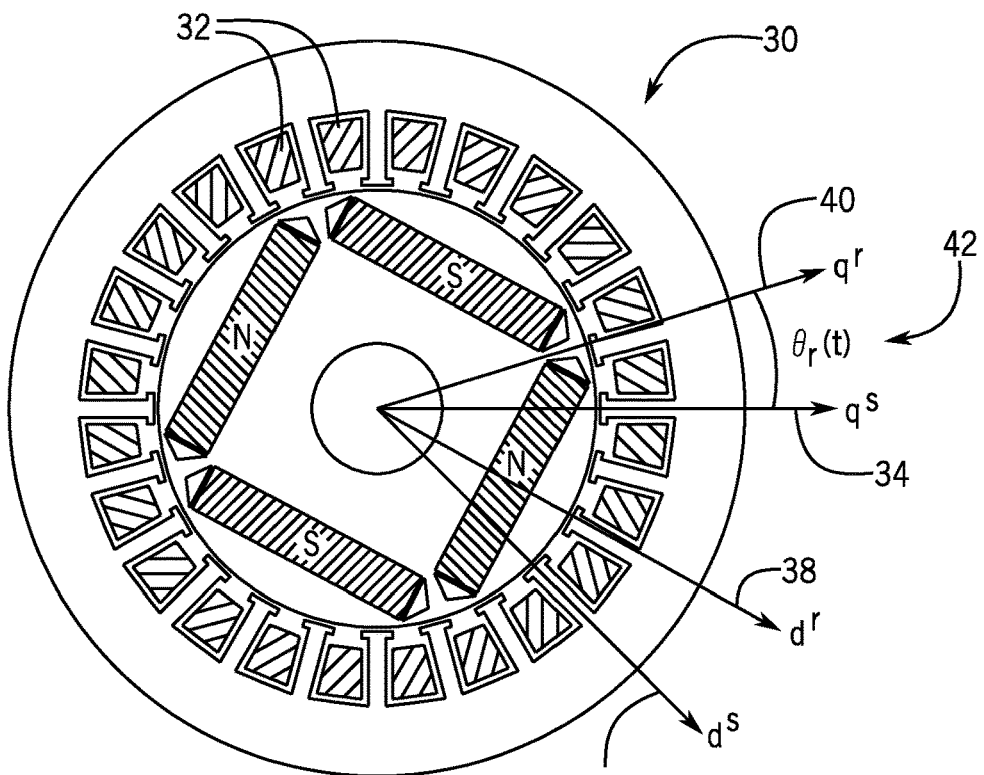
FIGS. 1A and 1B are illustrations of multi-phase AC electric machines with a stationary reference frame and rotor frame defined thereon.

For purposes of better understanding the descriptions set forth herebelow, the following listing of the nomenclature and abbreviations which will be used is provided.

Reference Frame Unit Vectors for AC Machines
$q^s$ stationary frame quadrature axis; aligned with a-phase in general
$d^s$ stationary frame direct axis;
$q^r$, q rotor synchronous frame quadrature axis
$d^r$, d rotor synchronous frame direct axis
$q^i$ current frame quadrature axis
$d^i$ current frame quadrature axis
q quadrature axis of the specified reference frame (rotor frame if not specified)
d quadrature axis of the specified reference frame (rotor frame if not specified)

Complex Vectors for AC Machine Variables (and Vector Generalization)
f bold characters used for complex vectors and complex coefficients bold characters used for vectors and matrices
$f_{qd} = f_q - j \cdot f_d$ complex vector representation for ac machine variables
$f_{qd} = [f_q \ f_d]^T$ 2D vector representation of a complex vector
j complex number operator
j rotation matrix of 90 degrees (matrix equivalent of j)

Superscripts for Reference Frame Identification
$f^s$ complex vector or 2D referred from the stationary reference frame
$f^r$ complex vector referred from the rotor reference frame
f complex vector referred from the rotor reference frame (reference frame subscript is omitted)
$f^i$ complex vector referred from the current reference frame Symbols for Physical Quantities
v voltage
i current
λ flux linkage
e back-EMF voltage
θ, ω angular position and angular velocity of a reference frame
$θ_r$, $ω_r$ electrical rotor angular position and rotor angular velocity
$θ_m$, $ω_m$ mechanical rotor angular position and rotor angular velocity
$T_{em}$ electromagnetic torque of an electric machine
$T_L$ load torque Superscripts for Variable Identifications
• differentiated quantity
^ estimated quantity
~ scaled quantity
* commanded or reference quantity Electric Machine Parameters
P number of poles
M number of stator phases
$L_s$, L stator inductance
r resistance matrix of an asymmetric machine
L inductance matrix of an asymmetric machine
$L_q$ q-axis inductance
$L_d$ d-axis inductance
$L_{qd}$, $L_{dq}$ mutual inductances between q and d axis windings With respect to the subsequent discussion of AC electric machines, reference frames are defined in order to represent the physical quantities of the phase winding domains variables as two-dimensional space vectors. For purposes of better explanation, reference is made to FIGS. 1A and 1B—which illustrates cutaway views of AC electric machines 30 and the placements of various reference frames thereon, including the stationary (or stator) reference frame and the rotor reference frame.

Among the multiple-phases of the stator windings 32 of the machine, one phase is used as the reference and is ordered as the 1st stator phase. The stationary reference frame quadrature axis ($q^s$-axis) 34 is defined as the unit vector in which direction the air-gap magnetomotive force (MMF) is maximum when the positive current is applied to the 1st stator phase. The stationary reference frame direct axis ($d^s$-axis) 36 is defined as the unit vector, whose angle is at negative 90 electrical degrees from the $q^s$-axis direction.

For a machine with a permanent magnet rotor, the rotor reference frame direct axis (dr-axis) 38 is defined as the unit vector, in which direction the permanent magnet north pole is aligned—such that the air-gap magnetomotive force (MMF) is maximum. The rotor reference frame quadrature axis (q$^r$-axis) 40 is defined as the unit vector whose angle is at 90 electrical degrees from the d$^r$-axis. For the rotor reference frame, the superscript 'r' is often omitted. As shown in FIG. 1A, the electrical angle of the rotor reference frame from the stationary reference frame is defined as the electrical rotor angular position $\theta_r$ 42.

For a reluctance machine, the rotor reference frame definition can be extended from the definition of the permanent magnet machine, by simply keeping the same frame definition and by assuming the permanent magnets are not present in the rotor. In order to maintain the magnetic similarity of the reluctance machine to interior permanent magnet (IPM) machines, the rotor frame d-axis (dr-axis) is aligned with the minimum inductance axis.

Figure 1B:
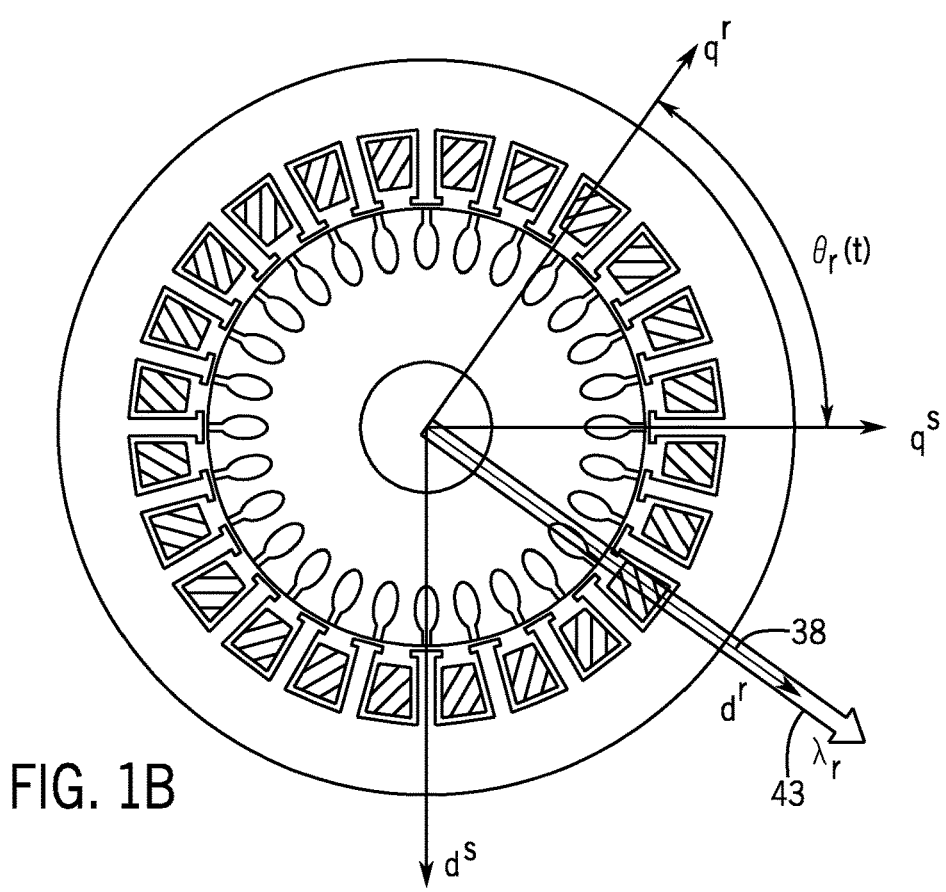

For the purpose of field oriented vector control of an induction machine, the rotor reference frame can be aligned with the rotor flux vector $\lambda_r$ 43, as shown in FIG. 1B specifically as the rotor frame d-axis (dr-axis) 38.

The definition of a complex vector for stator variables in the stationary reference frame is defined as the summation of all the phase variables $f_{ms}$ represented as complex vector being described as:

$$f_{qd}^s = f_q^s - jf_{dd}^s = \frac{2}{M}\sum_{m=1}^{M} f_{ms} e^{j\frac{2\pi(m-1)}{M}}$$

$$f_{qd}^s = f_q^s - jf_d^s = \frac{2}{M}\sum_{m=1}^{M} f_{ms} e^{j\frac{2\pi(m-1)}{M}}$$

$$f_q^s = \frac{2}{M}\sum_{m=1}^{M} f_{ms} \cos\frac{2\pi(m-1)}{M}$$

$$f_d^s = -\frac{2}{M}\sum_{m=1}^{M} f_{ms} \sin\frac{2\pi(m-1)}{M},$$

[Eqn. 1]

Where M is the number of stator phases and j is a complex number operator. The same stator variable can be represented as a 2-dimensional vector as:

$$f_{qd}^s = \begin{Bmatrix} f_q^s \\ f_d^s \end{Bmatrix}.$$

[Eqn. 2]

This stationary reference frame variable can be transformed to rotor reference frame using the following operation:

$$f_{qd}^r = f_{qd}^s e^{-j\theta_r} = f_q^r - jf_d^r$$

$$f_q^r = f_q^s \cos\theta_r - f_d^s \sin\theta_r$$

$$f_d^r = f_q^s \sin\theta_r + f_d^s \cos\theta_r$$

[Eqn. 3]

Inverse transformation to stationary reference frame from the rotor reference frame variable can then be performed according to:

$$f_{qd}^s = f_{qd}^r e^{j\theta_r} = f_q^s - jf_d^s$$

$$f_q^s = f_q^r \cos\theta_r + f_d^r \sin\theta_r$$

$$f_d^s = -f_q^r \sin\theta_r + f_d^r \cos\theta_r$$

[Eqn. 4].

According to embodiments of the invention, a system and method for self-sensing (including sensorless control) of an electric machine that allows for control over a full operating range of speed and torque are provided. A drive system that drives the electric machine includes a signal injector that operates to inject high frequency carrier signals, which are then combined/superimposed with a primary excitation vector. Here, a primary component of an electric machine variable, such as voltage, current, and flux and etc., is a low frequency component of the variable that is not the high frequency carrier injection signal or the carrier response signal. A rotor position estimator of the drive system monitors a magnetic alignment signature of the electric machine derived from small signal inductances and/or small signal reluctances in order to estimate a magnetic alignment of the electric machine and provide self-sensing thereof. The injection of the high frequency carrier signal may be provided as either rotating vector injection, pulsating vector injection, or a blended rotating and pulsating vector injection, and an adequate magnetic alignment signature may be measured and tracked, such that rotor position estimation and self-sensing of the electric machine may be provided. Furthermore, the injection of the high frequency carrier signal (i.e., the orientation and/or excitation frequency) may be manipulated or modified in order to reduce, regulate, control and/or limit undesired noise and/or vibration resulting from the carrier signal, while still providing for desired self-sensing performance.

As used herein, the term "self-sensing" refers to techniques that estimate the rotor position of the electric machine via the injection of a high frequency signal and accompanying measurement of a magnetic alignment signature. The self-sensing may be performed for electrical machines without the use of traditional rotor position or velocity shaft transducers such as encoders, resolvers, or tachometers (i.e., "sensorless" control), or may be performed for electrical machines where low-cost position sensors are still utilized but where high frequency injection and magnetic alignment signatures are used/measured for controlling the machine. The term "magnetic alignment signature" is understood to refer to a measurable parameter or signature that is derived from saturation behavior or the saliency of the electric machine dependent on a magnetic alignment (i.e., current angle γ) of excitation current provided to the stator thereof. That is, for an electric machine with inductance saliency—such as an interior permanent magnet synchronous motor (IPMSM), PM assisted synchronous reluctance machine, synchronous reluctance machine, saliency pole wound field machine, etc.—the high inductance magnetic path of the machine is saturated by excitation current much easier compared to the low inductance path. Therefore, given a high enough excitation current, the magnetic saturation is intensified as the excitation current is aligned closer to the high inductance axis—which, for example, would be the q-axis of an IPM machine and/or the d-axis of a salient pole wound field synchronous machine. This magnetic saturation results in a significant drop in small signal inductance of the high inductance axis, while—to the contrary—as the excitation current is aligned closer to the low inductance axis (e.g., d-axis of an IPM machine), the magnetic core of the electric machine comes out of saturation. This saturation behavior of an electric machine has strong sensitivity to the alignment of the motor current orientation relative to the rotor position and can be used for estimation of the rotor position of the electric machine, for purposes of self-sensing control. "Magnetic alignment" can be defined using current angle, an angle that can be defined as the angle of the current vector either in reference to a rotor features such as rotor pole or rotor magnet orientation, or in reference to the flux orientation of the electric machine such as the stator flux or rotor flux. Typically, the current angle has strong relationship with the output torque produced by the electric machine, such that mapping between torque and the signatures can be established as well. It's reasonable to use magnetic alignment signatures to characterize the output torque of the electric machine. With regard to use of the magnetic alignment signatures, it is recognized that use of the magnetic alignment signatures is not limited to scalar signals, but can be also be in the form of vector signals—as the magnetic alignment signatures are composed by multi-phase currents or voltages.

Figure 2:
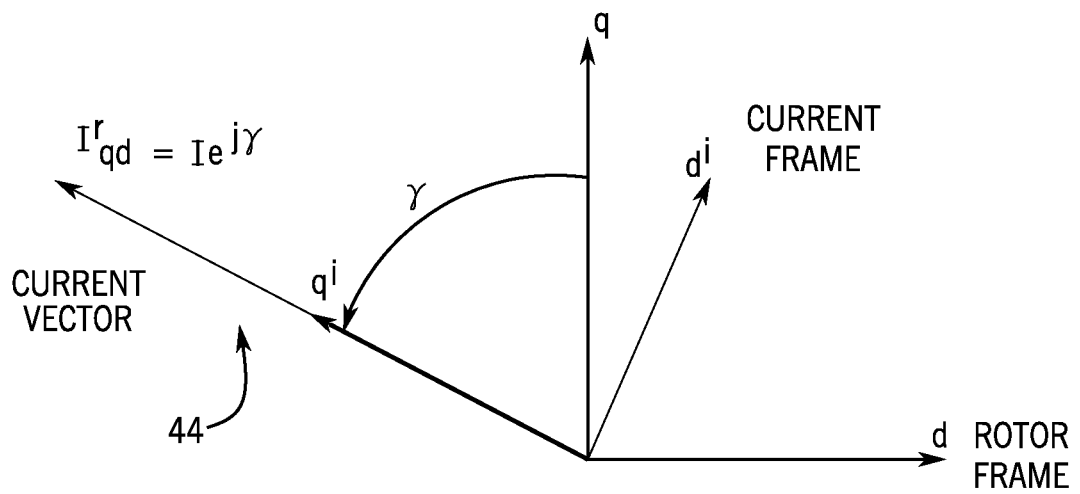
FIG. 2 is an illustration of an operating point current command vector relative to a defined rotor frame and current frame.

The saturation phenomena of the electric machine can be characterized by the inductances at the operating point $(I, \gamma)$ of the machine, mainly the small signal inductances. An operating point current command vector 44 for the given operating point $(I, \gamma)$ is illustrated in FIG. 2, with the operating point current command vector $I^r_{qd}$ 44 in the rotor reference frame being defined as:

$$I^r_{qd} = I^r_q - jI^r_d = Ie^{j\gamma} \quad [\text{Eqn. 5}]$$

$$I^r_{qd} = \begin{Bmatrix} I^r_q \\ I^r_d \end{Bmatrix}$$

$$I^r_q = I\cos\gamma, \ I^r_d = -I\sin\gamma,$$

where $\gamma$ is the current angle and $j$ is a complex number operator.

According to embodiments of the invention, one or more magnetic alignment signatures of the electric machine may be measured in order to determine "magnetic alignment information" of the electric machine. As will be explained in greater detail below, the operating point of the electric machine and the dynamic state of the machine dictate a preferred high frequency signal injection method and preferred magnetic alignment signature for determining magnetic alignment information of the electric machine, with load conditions, current level, and electric machine type, for example, determining the use of pulsating vector injection and measurement of a particular magnetic alignment signature (vector or scalar component signature).

One magnetic alignment signature that is measurable responsive to the providing of an operating point current command vector $I^r_{qd}$ d 44 to the electric machine is a small signal inductance in the rotor reference frame. Given the operating point current command vector $I^r_{qd}$ and the corresponding operating point flux $\Lambda^r_{qd}$, the small signal inductances in the rotor reference frame can be defined as:

$$\lambda^r_{qd} - \Lambda^r_{qd} = \begin{bmatrix} L_q & L_{qd} \\ L_{qd} & L_d \end{bmatrix}(i^r_{qd} - I^r_{qd}) \quad [\text{Eqn. 6}]$$

$$\delta\lambda^r_{qd} = \begin{bmatrix} L_q & L_{qd} \\ L_{qd} & L_d \end{bmatrix}\delta i^r_{qd},$$

where $L_q$ is the q-axis inductance, $L_d$ is the d-axis inductance, $L_{qd}$ and $L_{dq}$ are cross inductance values, $\delta i_{qd}$ is the small signal current variation vector from the operating point $I^r_{qd}$, and $\delta\lambda_{qd}$ is small signal flux variation vector from the operating point flux $\Lambda^r_{qd}$.

The inverse function of this small signal inductance can be also measured. These signatures can be referred to as inverse inductance or as reluctance $\mathcal{R}$, and can be defined as:

$$\delta i^r_{qd} = \begin{bmatrix} \mathcal{R}_q & \mathcal{R}_{qd} \\ \mathcal{R}_{qd} & \mathcal{R}_d \end{bmatrix}\delta\lambda^r_{qd}. \quad [\text{Eqn. 7}]$$

Rotor frame signatures can be measured only if the rotor angle is known. Practically, without the knowledge of orientation of the rotor frame, the magnetic alignment signatures are measured in reference to a different frame from the actual rotor frame.

Figure 3:
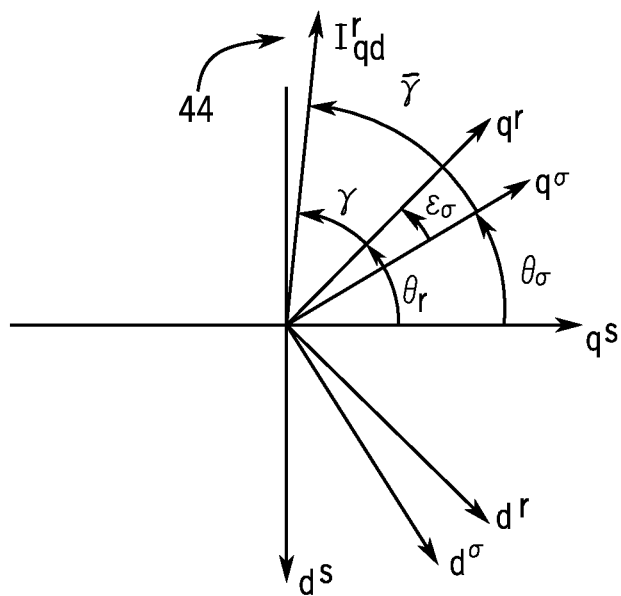
FIG. 3 is an illustration of an operating point current command vector relative to a saliency frame.

Another magnetic alignment signature that is measurable responsive to the providing of an operating point current command vector $I^r_{qd}$ d 44 to the electric machine is a small signal inductance in the saliency frame, with illustration of operating point current command vector 44 in the saliency frame being provided in FIG. 3. Using high frequency injection methods, orientation of the magnetic saliency can be measured and magnetic alignment signatures can be represented in reference to the saliency frame. With respect to use of small signal inductance in the saliency frame as a magnetic alignment signature, it is recognized that—for a salient electric machine—the saliency reference frame should ideally be equivalent to the rotor reference frame. However, due to cross saturation and saliency crossover due to saturation of the magnetization path, the saliency frame deviates from the rotor frame. With the minimum inductance axis being defined as the d-axis of the saliency frame (where the inductance is minimized), the small signal inductances in the saliency frame can be defined as:

$$\delta\lambda^\sigma_{qd} = \begin{bmatrix} L_{max} & 0 \\ 0 & L_{min} \end{bmatrix}\delta i^\sigma_{qd}, \quad [\text{Eqn. 8}]$$

where $L_{max}$ is the maximum inductance and $L_{min}$ is the minimum inductance.

The maximum inductance $L_{max}$ and the minimum inductance $L_{min}$ can be derived as follows:

$$L_{max} = L_\Sigma + L'_\Delta \quad [\text{Eqn. 9}]$$

$$L_{min} = L_\Sigma + L'_\Delta$$

$$L_\Sigma = \frac{L_q + L_d}{2}$$

$$L_\Delta = \frac{L_q - L_d}{2}$$

$$L'_\Delta = \sqrt{L^2_\Delta + L^2_{qd}}.$$

The inverse of maximum inductance $L_{max}$ can be defined as minimum reluctance $\mathcal{R}_{min}$. The inverse of minimum inductance $L_{min}$ can be defined as maximum reluctance $\mathcal{R}_{max}$. The average value of $\mathcal{R}_{max}$ and $\mathcal{R}_{min}$ can be defined as average reluctance as $\mathcal{R}_\Sigma$.

To quantitatively assess the saliency, saliency $\sigma_s$ may be defined as the ratio of the maximum inductance $L_{max}$ to the minimum inductance $L_{min}$ according to:

$$\sigma_s(I, \gamma) = \frac{L_{max}}{L_{min}}. \quad \text{[Eqn. 10]}$$

A saliency angle error $\varepsilon_\sigma$ can also be derived according to:

$$\varepsilon_\sigma(I, \gamma) = \frac{1}{2}\tan^{-1}\left(\frac{2L_{qd}}{L_q - L_d}\right). \quad \text{[Eqn. 11]}$$

Use of rotating vector excitation allows the estimation of the complete $L_{max}$, $L_{min}$, and saliency angular position $\theta_\sigma$. Pulsating injection methods that track the d-axis can estimate the saliency angular position $\theta_\sigma$ and $L_{min}$, but $L_{max}$ cannot be estimated. Conversely, pulsating injection methods that track the q-axis can estimate $L_{max}$, but not $L_{min}$.

Based on these limitations of measuring small signal inductance in the saliency frame, another magnetic alignment signature that might be useful is small signal inductances or reluctances in the current reference frame, with illustration of an operating point current command vector in the current frame being provided in FIG. 2. The small signal inductances or reluctances in the current reference frame are measurable responsive to the providing of an operating point current command vector $I^r_{qd}$ 44 to the electric machine, with the current angle of the small signal inductances or reluctances being explicitly known through current measurement.

The small signal inductance in the current reference frame can be defined as:

$$\delta\lambda^i_{qd} = \begin{bmatrix} L^i_q & L^i_{qd} \\ L^i_{dq} & L^i_d \end{bmatrix} \delta i^i_{qd}, \quad \text{[Eqn. 12]}$$

where $L^i_q$ is the q-axis inductance in the current frame, $L^i_d$ is the d-axis inductance in the current frame, $\delta i^i_{qd}$ is the perturbed current on the d-axis or q-axis in the current frame as induced by the injected high frequency signal, and $L^i_{qd}$ and $L^i_{dq}$ are cross inductance values present due to cross saturation in the AC electric machine.

The small signal reluctance in the current reference frame can be defined as:

$$\delta i^i_{qd} = \begin{bmatrix} \mathcal{R}^i_q & \mathcal{R}^i_{qd} \\ \mathcal{R}^i_{dq} & \mathcal{R}^i_d \end{bmatrix} \delta\lambda^i_{qd}$$

which can be further divided into individual reluctance values (and defined in terms of inductance) according to:

$$\mathcal{R}^i_q = \frac{L^i_d}{L^i_q L^i_d - L^i_{qd} L^i_{dq}}, \quad \text{[Eqn. 13]}$$

$$\mathcal{R}^i_{qd} = \frac{-L^i_{qd}}{L^i_q L^i_d - L^i_{qd} L^i_{dq}},$$

$$\mathcal{R}^i_{dq} = \frac{-L^i_{dq}}{L^i_q L^i_d - L^i_{qd} L^i_{dq}},$$

$$\mathcal{R}^i_d = \frac{L^i_q}{L^i_q L^i_d - L^i_{qd} L^i_{dq}},$$

where $\mathcal{R}^i_q$ is the q-axis reluctance in the current frame, $\mathcal{R}^i_d$ is the d-axis reluctance in the current frame, $\delta i^i_{qd}$ is the perturbed current on the d-axis or q-axis in the current frame as induced by the injected high frequency signal, and $\mathcal{R}^i_{qd}$ and $\mathcal{R}^i_{dq}$ are cross reluctance values present due to cross saturation in the AC electric machine.

Figure 4A:
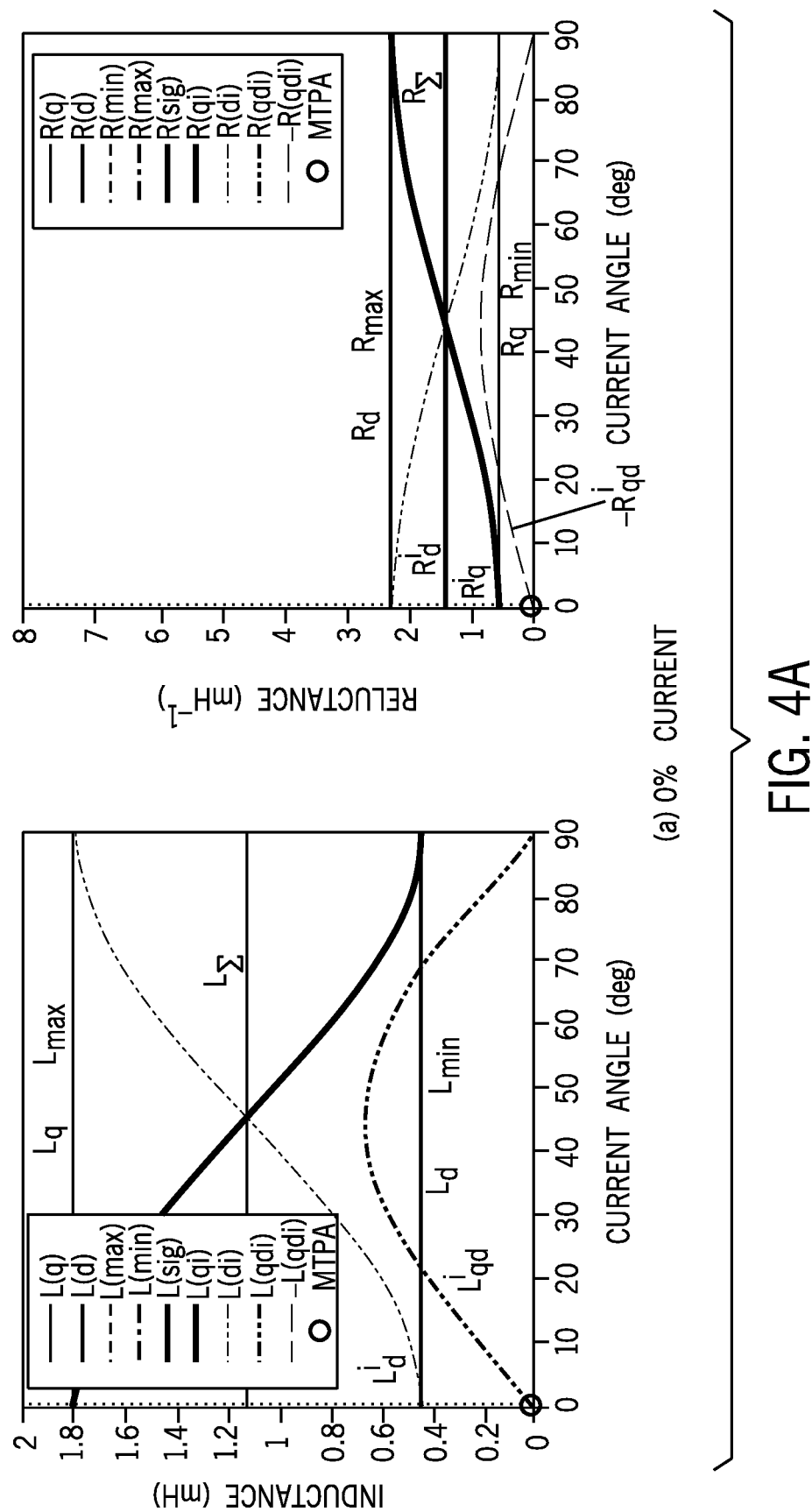
FIGS. 4A-4C are graphs illustrating small signal magnetic alignment signatures at various current levels for an exemplary IPM motor.
Figure 4B:
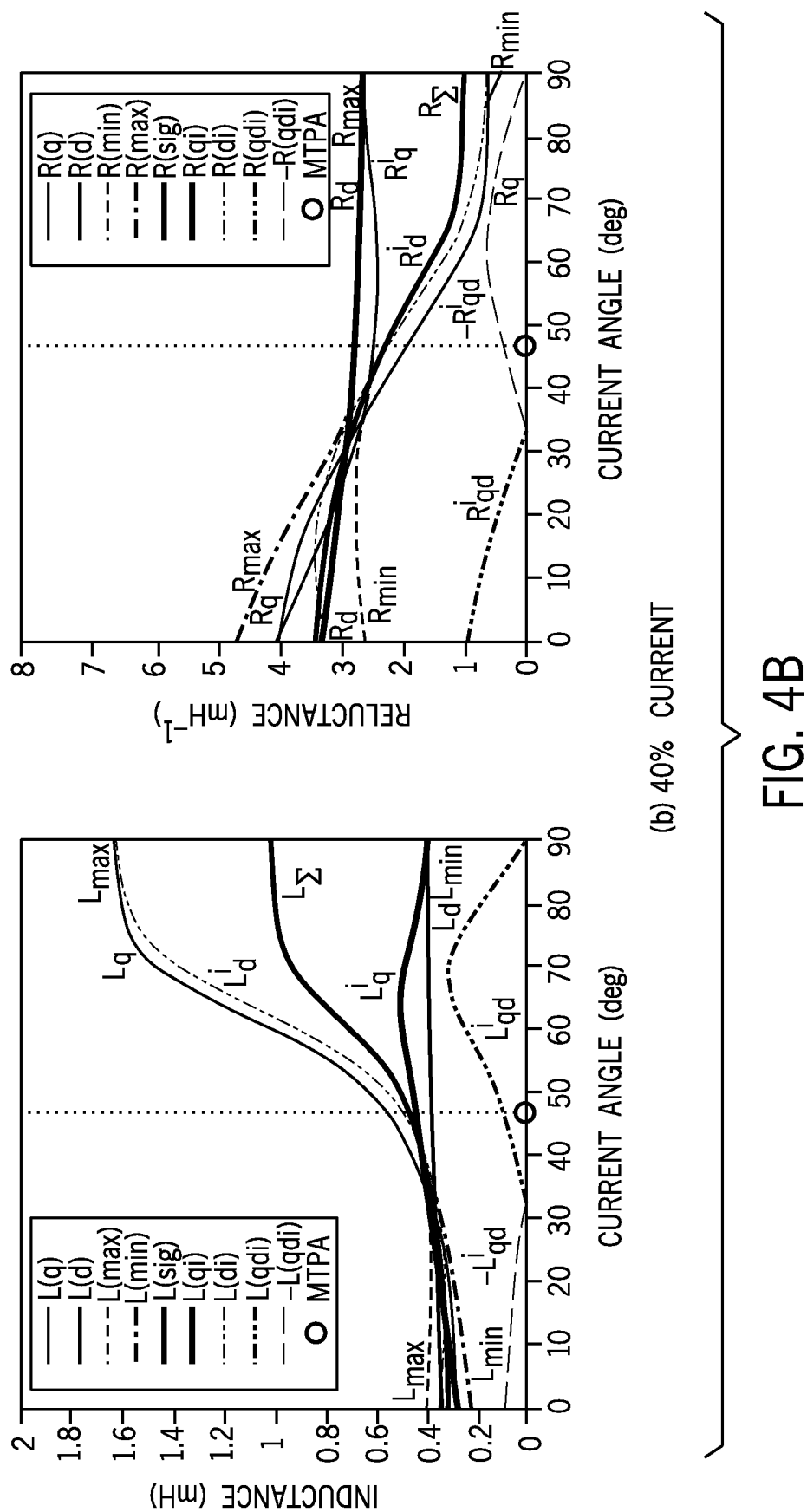
Figure 4C:
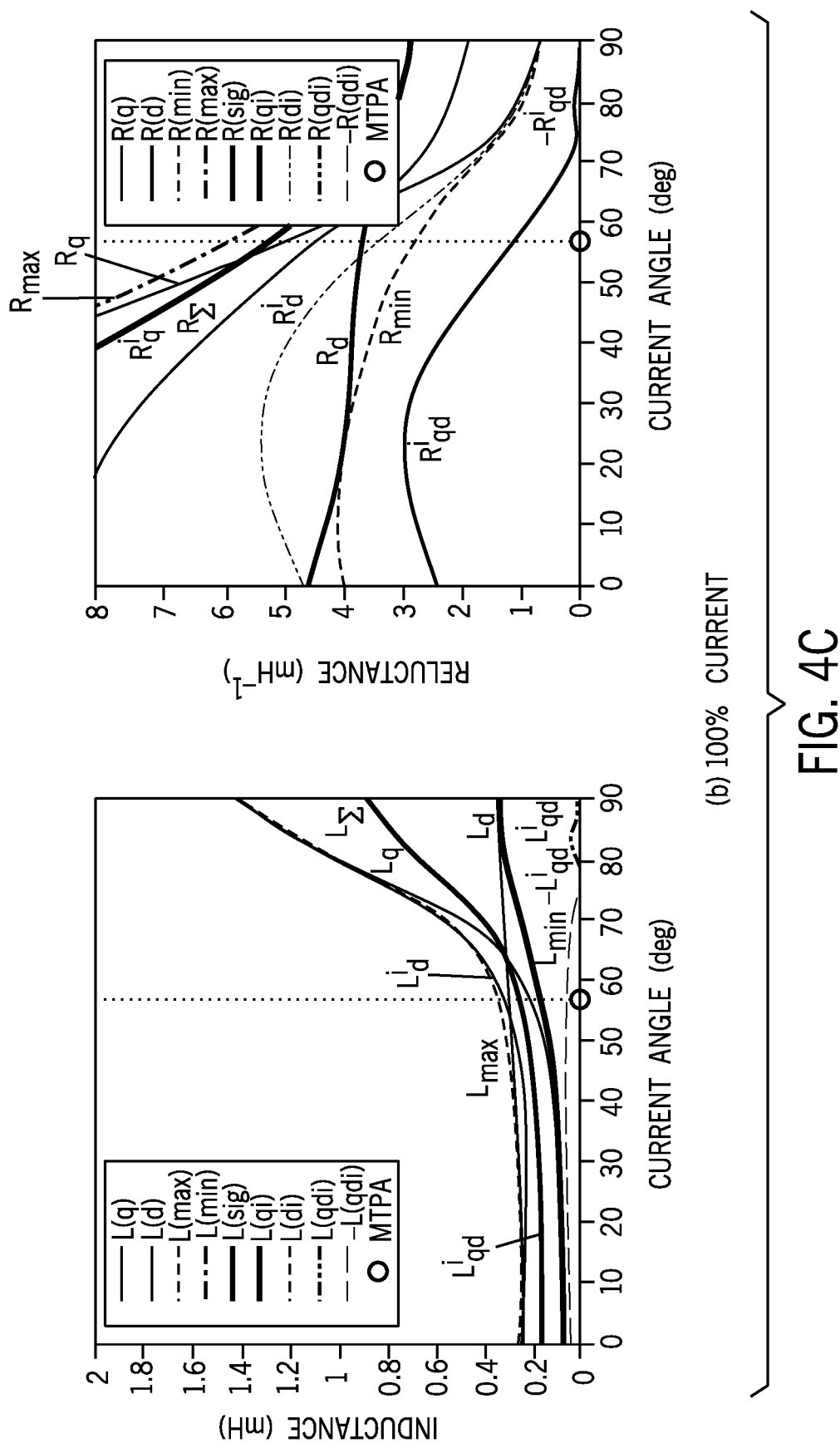

The small signal signatures in the rotor, saliency, and current reference frames described above have sensitivity to magnetic alignment, i.e., to the current angle $\gamma$, with FIGS. 4A-4C illustrating these small signal signatures at various current levels for an exemplary IPM motor. The range of current angle in these plots was limited between 0° and 90°. The range covers the typical motoring operating range. The braking operating range will be between 90° and 180° and the signatures will have a mirror image around the 90° point, except for the cross inductance and cross reluctance terms, which will have inverse mirror image. Typically, the current angle $\gamma$ has strong relationship with torque produced by the electric machine, such that mapping between torque and the signatures can be established as well when torque can be measured or estimated.

As can be seen in FIG. 4A, for no load or very low current operating points, where the desired current vector direction is close to the q-axis, the current frame cross inductance $L^i_{qd}$ (as well as the current frame cross reluctance $\mathcal{R}^i_{qd}$) has very good sensitivity while the rest of the signals are not very sensitive.

However, as the current level is increased, the operating point current angle $\gamma$ deviates from the q-axis and increases towards 90°. As is shown in FIG. 4B, for a 40% current level, rotor frame q axis inductance $L_q$ and rotor frame q axis reluctance $\mathcal{R}_q$ show strong and wide sensitivity range around the operating current angle $\gamma$. This q-axis variation shows up in the current frame and saliency frame signatures. The current frame d-axis inductance $L^i_d$ and current frame d-axis reluctance $\mathcal{R}^i_d$ show good sensitivity range around the operating current angle $\gamma$. Rotating vector injection methods can extract saliency frame inductances $L_{min}$, $L_{max}$, and $L_\Sigma$, as well as saliency frame reluctances $\mathcal{R}_{max}$, $\mathcal{R}_{min}$ and $\mathcal{R}_\Sigma$, which can provide even wider sensitivity range if combined together. However, saliency tracking based on pulsating vector injection will have limitations, because it can extract only one signature between $L_{min}$ and $L_{max}$, or between $\mathcal{R}_{max}$ and $\mathcal{R}_{min}$, such that sensitivity range is significantly limited around the operating point current angle. This is due to the sharp change of signature sensitivity near current angle near 35°, where saliency crosses over from q-axis to d-axis. It should be noted that saliency tracking sensorless operating fails already at 40% current level, due to close proximity to the saliency crossover at the desired operating point.

As shown in FIG. 4C, as the current level is further increased, the saturation of the q-axis gets deeper, leading to stronger and wider sensitivity of the rotor frame q-axis inductance $L_q$ and rotor frame q axis reluctance $\mathcal{R}_q$. Sensitivities of the current frame d-axis inductance $L^i_d$ and the current frame d-axis reluctance $\mathcal{R}^i_d$ also strengthen significantly. However, as the rotor frame q-axis inductance $L_q$ drops below $L_d$, the sensitivity ranges of the current frame d-axis inductance $L^i_d$ and the current frame d-axis reluctance $\mathcal{R}^i_d$ start to reduce near the rotor frame q-axis. To the contrary, sensitivities and ranges of the current frame q-axis inductance $L^i_q$ and the current frame q-axis reluctance $\mathcal{R}^i_q$ strengthen significantly. Accordingly, rotating injection would be very effective, since the combination of saliency frame inductances $L_{min}$, $L_{max}$, and $L_\Sigma$ as well as saliency frame reluctances $\mathcal{R}_{max}$, $\mathcal{R}_{min}$, and $\mathcal{R}_\Sigma$, also provide very strong sensitivity and range. Alternatively, while minimum inductance $L_{min}$ or maximum inductance $L_{max}$ tracking pulsating injection both have decent sensitivity, they are not as strong as the previously mentioned signatures.

In summary, as shown in FIG. 4A-4C, the presented magnetic alignment signatures (current frame signatures or saliency frame signatures) combined have strong sensitivity and wide sensitivity range to magnetic alignment over the entire 0~100% current range. This establishes the potential of 100% full torque self-sensing operation of the IPM machines using magnetic alignment signatures.

Figure 5A:
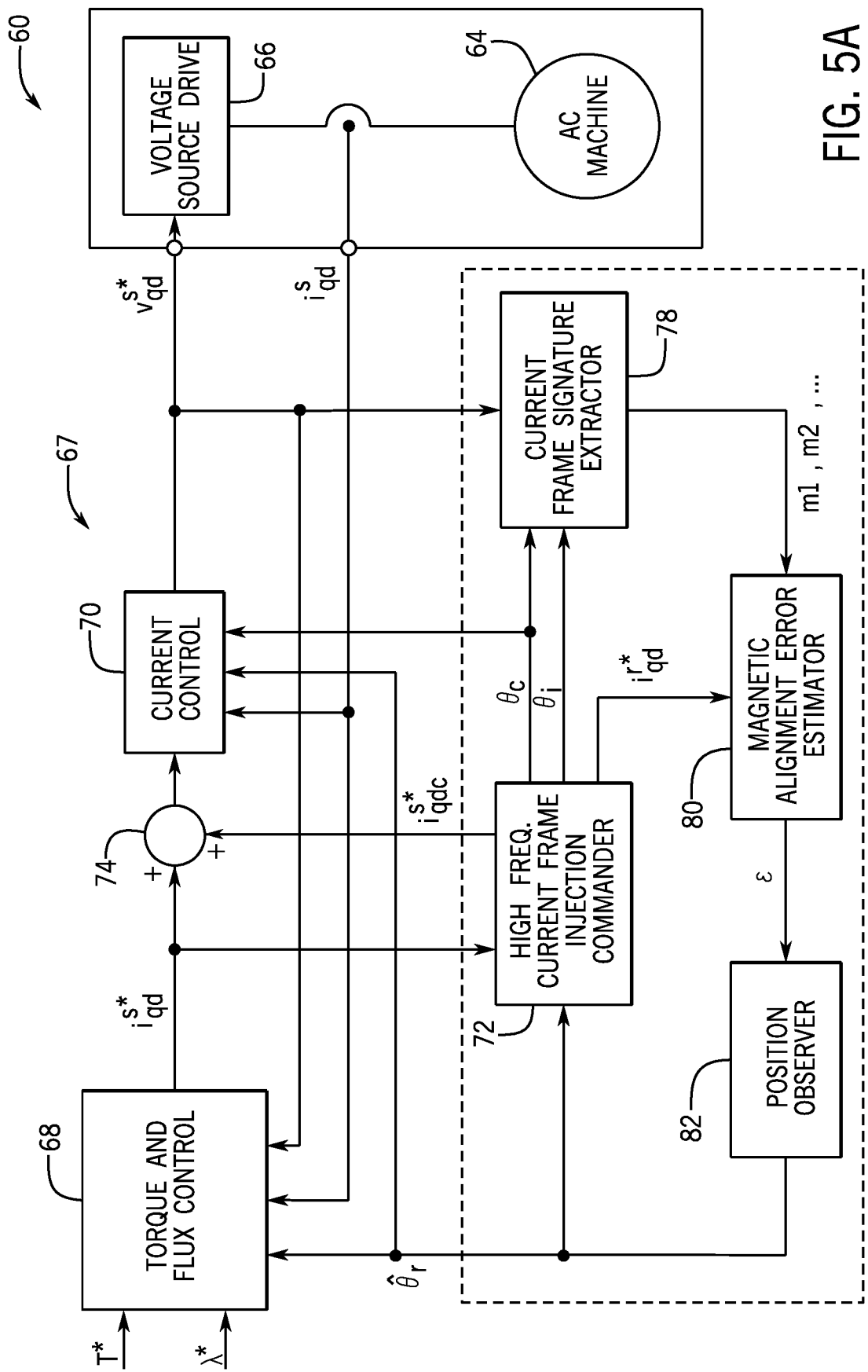
FIG. 5A is a block diagram of a drive system that implements a self-sensing control scheme via a high frequency current injection and magnetic alignment signature sensing, according to an embodiment of the invention.
Figure 6A:
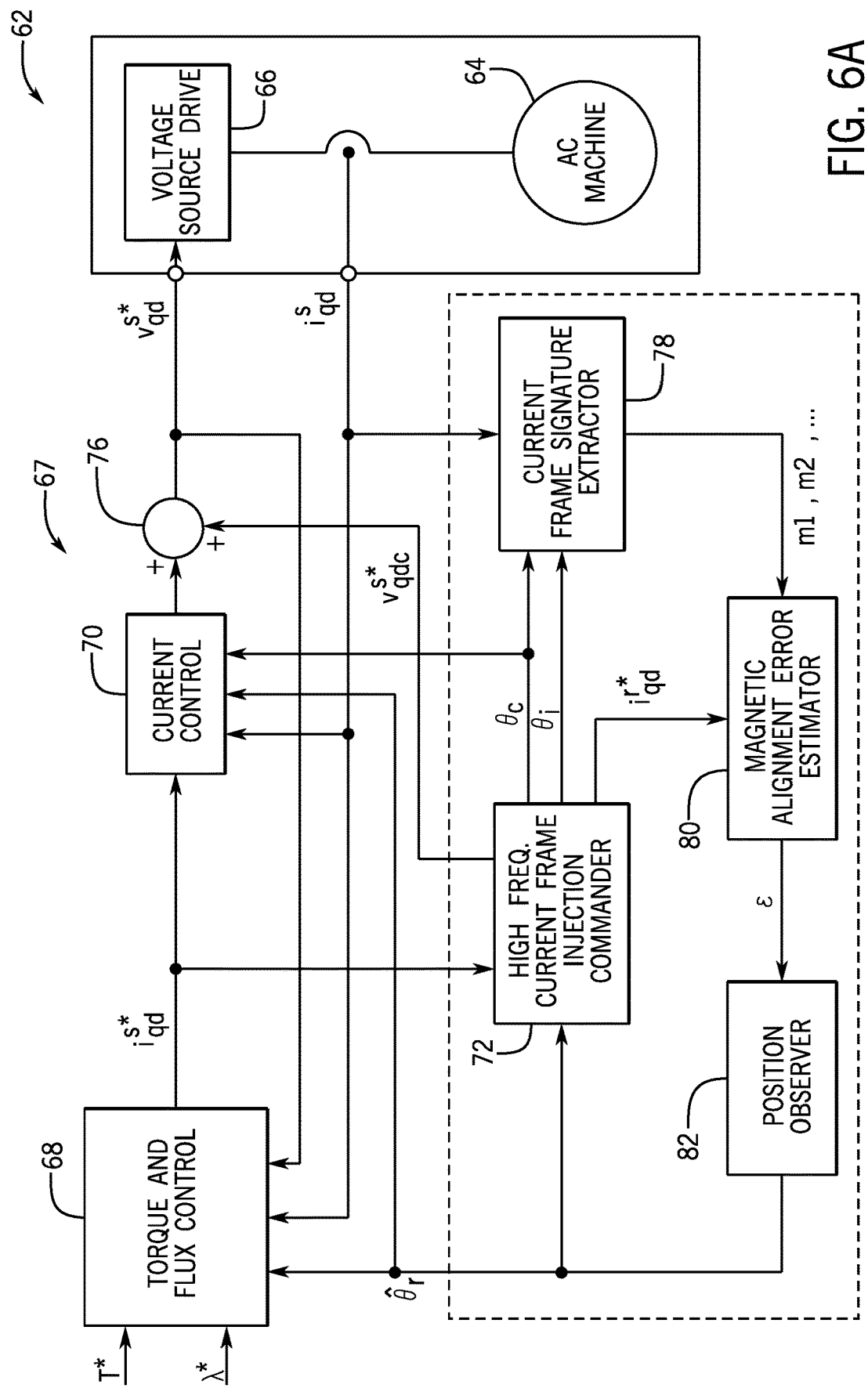
FIG. 6A is a block diagram of a drive system that implements a self-sensing control scheme via a high frequency voltage injection and magnetic alignment signature sensing, according to an embodiment of the invention.

Referring now to FIGS. 5A and 6A, block diagrams of drive systems 60, 62 configured to implement a self-sensing control technique for controlling operation of an AC electric machine are provided, according to embodiments of the invention. The drive systems 60, 62 provide AC drive power to an AC electric machine 64 composed of a stator and rotor (not shown) using sensorless rotor tracking of the machine, with such sensorless rotor tracking being achieved by measuring one or more of the small signal magnetic alignment signatures described previously above. The drive systems 60, 62 may be implemented with various types of electric machines that are capable of being driven with AC power to provide such sensorless rotor tracking, such as synchronous motors, including synchronous permanent magnet and synchronous reluctance motors, and induction motors. Additionally, the drive systems 60, 62 may provide such self-sensing rotor tracking whether the AC electric machine 64 is used as a motor or a generator.

According to embodiments of the invention, the AC electric machine 64 operated by drive system 60, 62 may be any of an interior permanent magnet (IPM) machine, a permanent magnet (PM) assisted synchronous reluctance machine, a synchronous reluctance machine, and an inductance machine. Thus, while embodiments of the invention are described and illustrated here after specifically with regard to operation of an IPM machine, it is to be understood that such discussion of these embodiments also extends to other electric machine types and constructions, including PM assisted synchronous reluctance machines, synchronous reluctance machines, and inductance machines as mentioned. Additionally, it is to be understood that such discussion of these embodiments also extends to linear machines.

In FIGS. 5A and 6A, embodiments of drive systems 60, 62 are shown in which an electric machine power converter 66 and control system 67 are utilized to drive the AC electric machine 64, with high frequency signal injection and parameter signature tracking being used to determine and track a rotor position of the AC electric machine 64. In one embodiment, and as shown in FIGS. 5A and 6A, electric machine power converter 66 is provided as a voltage source drive, although it is recognized that the electric machine power converter 66 could instead be provided as a current source drive such as a current source inverter (CSI). Voltage source drives 66 for AC machines are well known and may be constructed in various ways, depending on the requirements for driving the electric machine. While control system 67 and the control scheme implemented thereby are shown separately from power converter 66, it is recognized that the control system could be provided either as a controller separate from power converter 66 or as a controller or processor incorporated into power converter 66, according to embodiments of the invention.

As shown in FIGS. 5A and 6A, command signals are provided to the voltage source drive 66 from control system 67, with control system 67 including torque and flux controller 68 and a current controller or regulator 70. System inputs in the control system 67 are torque T* and flux level λ* commands received by the torque and flux controller 68. Responsive to the torque T* and flux level λ* commands, the torque and flux controller 68 outputs a current reference $i_{qd}^{s*}$ to current controller 70, which subsequently outputs commands to voltage source drive 66. Operation of drive system 60, 62 thus results in providing of a primary current excitation (in the form of a current vector having a magnitude and angle) to the AC electric machine 34 to drive the electric machine according to a desired operation.

Also included in the control system 67 is a signal injector 72 that operates to inject high frequency carrier signals to the AC electric machine, with such signals being combined with (i.e., superimposed on) the primary current excitation current vector generated by drive system 60, 62. In the embodiment of FIG. 5A, the signal injector 72 is configured to inject a high frequency current signal onto the current reference $i_{qd}^{s*}$ at adder 74 to create a net current signal or command that is provided to current controller 70. In the embodiment of FIG. 6A, the signal injector 72 is configured to inject a high frequency voltage signal onto the output commands from current controller 70 at adder 76 to create a net signal that is provided to voltage source drive 66.

As shown in FIGS. 5A and 6A, a signature extractor 78, magnetic alignment error estimator 80, and a position observer 82 (collectively, "position estimator") are also included in the control system 67 of drive system 60, 62. Operation of the signature extractor 78, magnetic alignment error estimator 80, and position observer 82 within drive system 60, 62 (along with operation of signal injector 72) provide for position estimation and self-sensing control of the electric machine 64, as will be explained in greater detail below.

In operation of motor drive system 60, 62, it is desired to have measurement or estimate of flux $\lambda_{qd}^{s}$ and torque $T_{em}$ for the control of torque and flux of the electric machine. Typically, if the flux vector $\lambda_{qd}^{s}$ and current vector $i_{qd}^{s}$ are measured, torque $T_{em}$ can be estimated based on the following physical relationship:

$$T_{em} = \frac{M}{2}\frac{P}{2}(\lambda_{qd}^{s} \times i_{qd}^{s}) = \frac{M}{2}\frac{P}{2}(\lambda_{d}^{s}i_{q}^{s} - \lambda_{q}^{s}i_{d}^{s}), \quad \text{[Eqn. 14]}$$

where M is number of stator phases and P is number of magnetic poles of the electric machine.

When the frequency of AC rotation is high enough, stator flux can be calculated by integrating the terminal voltage $v_{qd}^{s}$ less the estimated resistive voltage drop $r_s i_{qd}^{s}$. However, this approach doesn't work well, when the frequency is low. Accordingly, for DC or low frequency operation, flux and torque control often rely on rotor position and current information. Given the knowledge of the electric machine characteristics, knowing the orientation or position of the rotor (or the rotor flux)$\theta_r$ along with the current measurement $i_{qd}^{s}$ allows estimation of flux. In other words, given the rotor position $\theta_r$, the torque and flux controller can provide a desired current reference $i_{qd}^{s*}$ that achieves the desired flux and torque, based on the prior knowledge of the machine's characteristics. Therefore, it is necessary to have the rotor position information to be able to control an AC electric machine, especially at zero or low frequency operation.

Since a voltage source drive is typically used for electric machine drive systems 60, 62, current control is necessary to achieve the desired current $i_{qd}^{s*}$ at the electric machine. If a current source drive is used, current control may not be necessary. In that case, the motor terminal voltage reference $v_{qd}^{s*}$ is not available, making measurement of motor terminal voltage $v_{qd}^{s}$ necessary.

For providing self-sensing control for electric machine 64, the drive system 60, 62 targets the enabling of position estimation for zero or low frequency operation, by injecting high frequency carrier voltage $v_{qdc}^{s*}$ or current $i_{qdc}^{s*}$ to the electric machine 64 and by extracting key magnetic alignment signatures (previously described) that enable the rotor position estimation. Specific injection methods for injecting the high frequency carrier and measuring/analysis of specific magnetic alignment signatures may be employed by the drive system 60, 62 to extract the magnetic alignment signatures, with preferred injection methods and preferred magnetic alignment signatures that are chosen being dependent on the operating point of the electric machine 64 and on the dynamic state of the machine, so as to improve and maximize the performance of the position estimation.

As shown FIGS. 5A and 6A, a motor terminal voltage reference $v_{qd}^{s*}$ can be used instead of the measured motor terminal voltage $v_{qd}^{s}$, assuming the voltage error is sufficiently low or can be compensated sufficiently. However, it is recognized that it may be challenging to accurately estimate and compensate the voltage error caused by switching device non-idealities such as propagation delay, non-linear device voltage drop, and dead-time, as well as the variation of DC bus voltage. Therefore, direct measurement of motor terminal voltage $v_{qd}^{s}$ is often preferred when improvement of voltage accuracy is desired. Similar logic would apply to the use of a motor current measurement in a drive system where a current source drive is used rather than a voltage source drive.

Figure 5B:
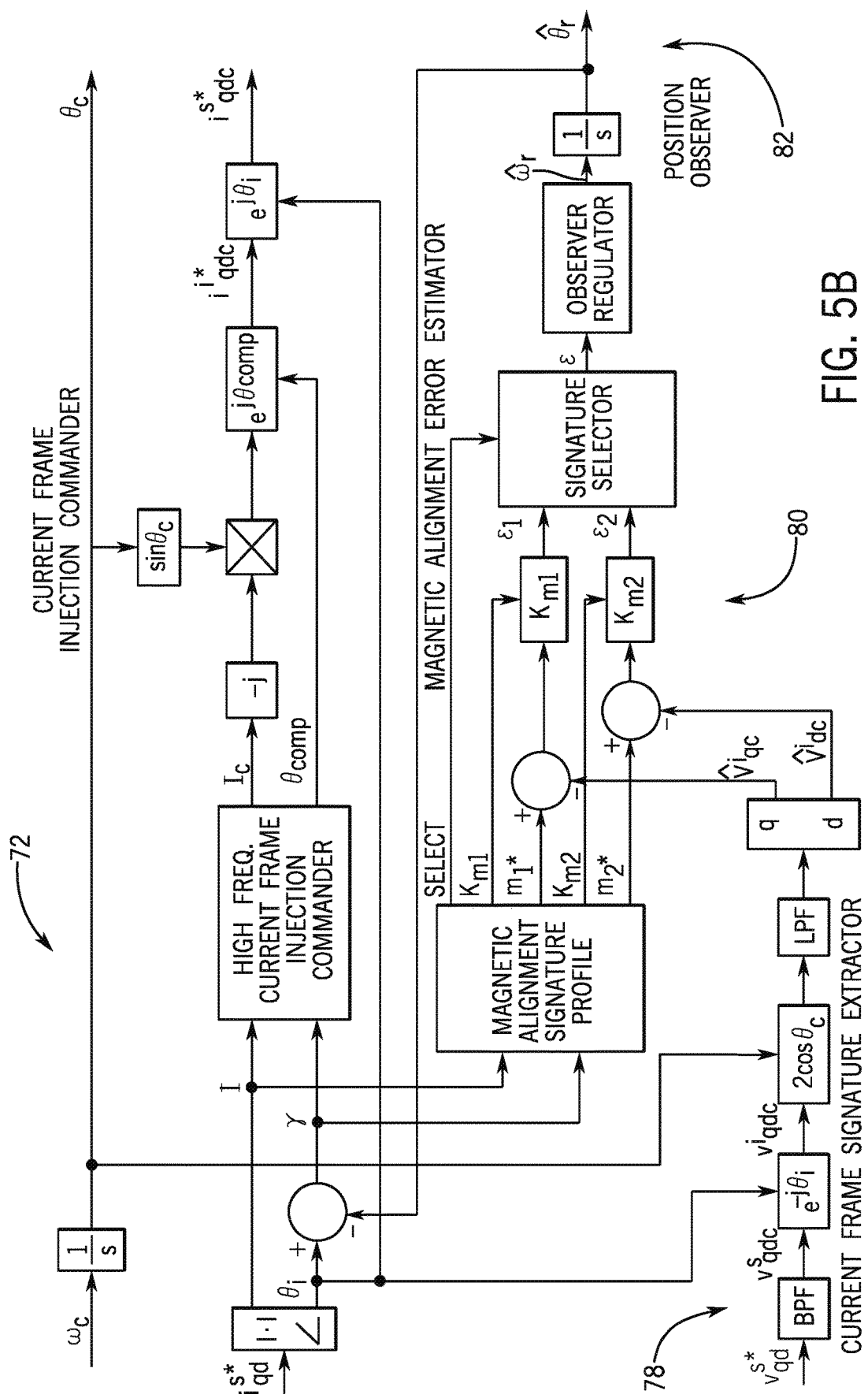
FIG. 5B is a block diagram of the signal injector, signal extractor, magnetic alignment error estimator and position observer in the drive system of FIG. 5A illustrating operations performed by each respective device, according to an embodiment of the invention.
Figure 6B:
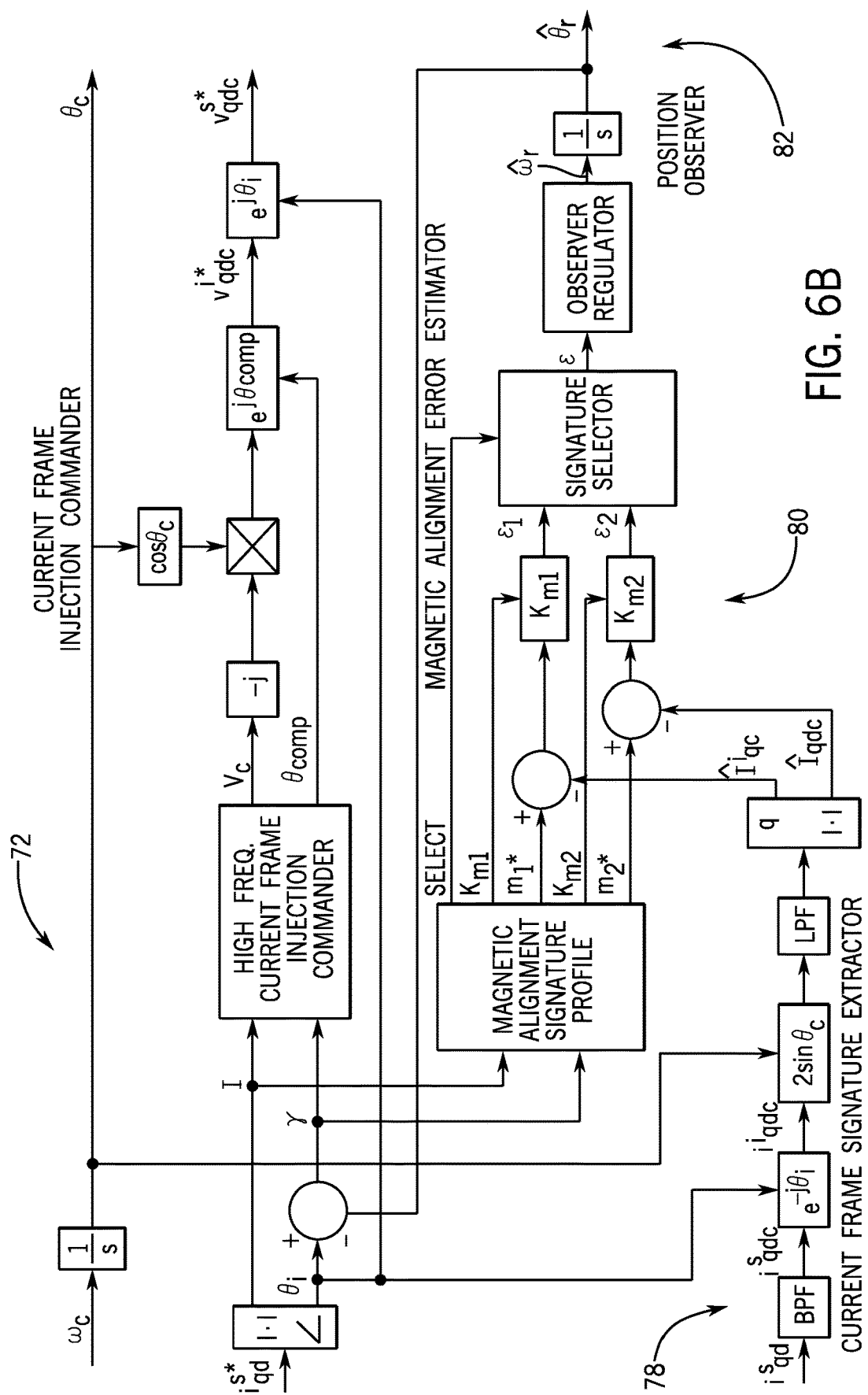
FIG. 6B is a block diagram of the signal injector, signal extractor, magnetic alignment error estimator and position observer in the drive system of FIG. 6A illustrating operations performed by each respective device, according to an embodiment of the invention.

FIGS. 5B and 6B provide a more detailed view of the operations performed by the signal injector 72, signature extractor 78, magnetic alignment error estimator 80, and position observer 82, for embodiments where a high frequency current signal is injected and where a high frequency voltage signal is injected, respectively. The functions of each of the signal injector 72, signature extractor 78, magnetic alignment error estimator 80, and position observer 82 are set forth in greater detail here below.

Figure 7:
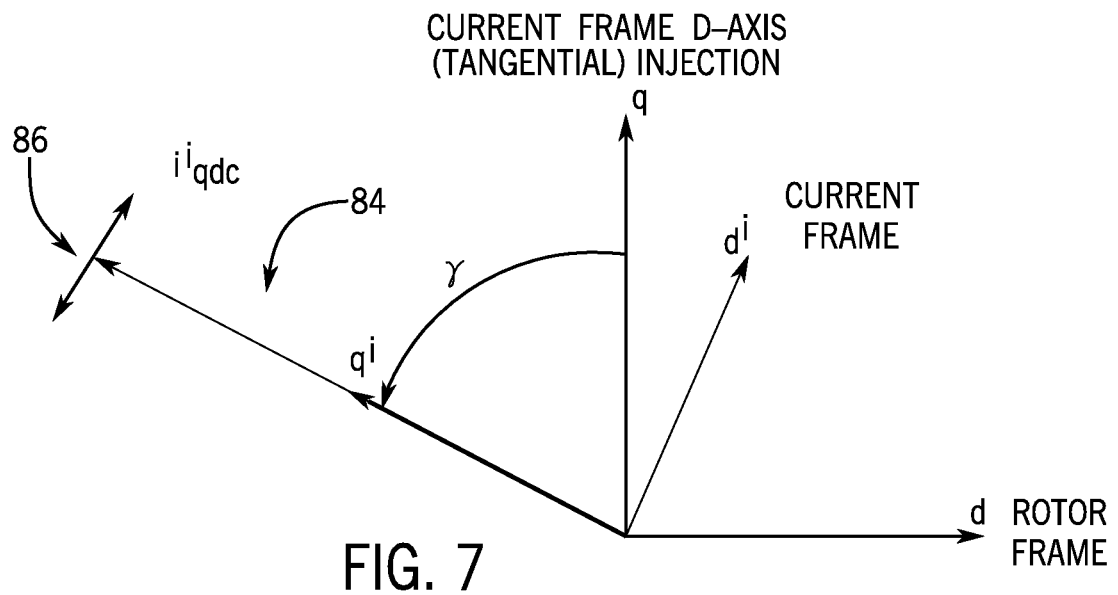
FIG. 7 is a graph illustrating injection of a high frequency signal to a primary excitation current vector on a current reference frame, with the high frequency signal being tangential to the primary current vector, according to an embodiment of the invention.

With regard to the injection of a high frequency injection signal by signal injector 72, injection of such a high frequency signal is illustrated in FIG. 7, according to one embodiment. As shown in FIG. 7, for a desired primary excitation current vector 84 of magnitude I and at an angle γ in the rotor reference frame, a high frequency signal 86 may be injected in a defined current frame (rotated from the rotor frame) that is tangential/orthogonal to the current vector 84. Injecting a high frequency signal 86 orthogonal to the current vector $I^{r}_{qd}$, i.e., on the current frame d-axis ($d^{i}$-axis), is advantageous because the torque ripple produced by the high frequency current can be significantly reduced as long as the current angle is maintained near the MTPA (maximum torque per ampere) point. When the injection frequency is in the range of audible frequency, audible noise can also be reduced for the same level of injecting current amplitude.

In an embodiment where the high frequency signal is injected by signal injector 72 as a pulsating high frequency current signal, such as illustrated in the drive system of FIGS. 5A and 5B, the desired injection current $i_{qdc}^{i}$ can be represented as:

$$i_{qdc}^{i}=i_{qc}^{i}-ji_{dc}^{i}=-jI_c \sin \omega_c t$$

$$i_{qc}^{i}=0, i_{dc}^{i}=I_c \sin \omega_c t \qquad [\text{Eqn. 15}],$$

where $I_c$ is the magnitude of the high frequency current and $\omega_c$ is the pulsation frequency of the high frequency current. Here, the pulsation carrier angle $\omega_c t$ can be defined as a carrier angle variable $\theta_c$ and used for both signal injection and for signature extraction as shown in FIG. 5B, and can also be used in the current controller 70 for carrier current injection regulation as shown in FIG. 5A. Using the carrier angle information $\theta_c$, the carrier frame regulator can be implemented to achieve the desired carrier injection current component $i_{qdc}^{i}$.

Figure 8:
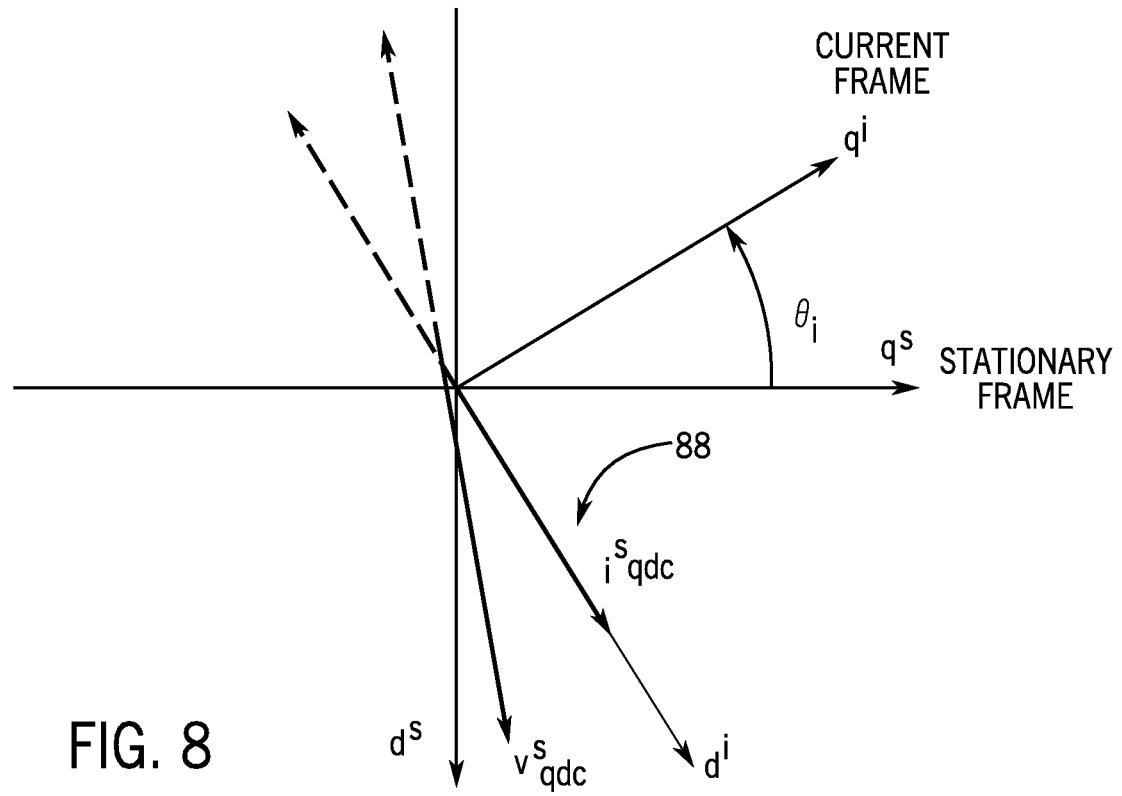
FIG. 8 is a graph illustrating injection of a pulsating, high frequency current signal on the current reference frame, according to an embodiment of the invention.

As illustrated in FIG. 8, in the stationary reference frame, this pulsating vector 88 can be written as $$i_{qdc}^{s}=-jI_c \sin \omega_c t\, e^{j\theta_i}=I_c \sin \omega_c t(-\sin \theta_i + j \cos \theta_i) \qquad [\text{Eqn. 16}],$$

where $\theta_i$ is the angular position of the current vector in reference to the stator q-axis. Illustration of the operations performed and variables applied by the signal injector 72 in Equations [15] and [16] are illustrated in the block diagram of FIG. 5B.

Upon injection of a pulsating high frequency current signal by signal injector 72, and responsive to the current injection, a pulsating voltage vector $v_{qdc}^{i}$ may be extracted by current frame signature extractor 78 that can be represented as:

$$v_{qdc}^{i}=v_{qc}^{i}-jv_{dc}^{i}=\omega_c(L_{qd}^{i}-jL_{d}^{i})I_c \cos \omega_c t$$

$$v_{qc}^{i}=\omega_c L_{qd}^{i} I_c \cos \omega_c t, v_{dc}^{i}=\omega_c L_{d}^{i} I_c \cos \omega_c t$$

$$V_{qc}^{i}=\omega_c L_{qd}^{i} I_c, V_{dc}^{i}=\omega_c L_{d}^{i} I_c$$

$$V_{qdc}=|V_{qc}^{i}-jV_{dc}^{i}|=\omega_c I_c |L_{qd}^{i}-jL_{d}^{i}| \qquad [\text{Eqn. 17}].$$

From the measured voltage vector response $v_{qdc}^{i}$, the current frame d-axis inductance $L_{d}^{i}$ and the pulsating frame cross inductance $L_{qd}^{i}$ can thus be estimated. Also, the entire carrier voltage response magnitude $V_{qdc}$ can be used as a signature as well, where it is a composite signature of both $L_{d}^{i}$ and $L_{qd}^{i}$ as shown in [Eqn. 17].

It is noted that, while the injection current is aligned to the d-axis of the current frame, the voltage response had a q-axis component, which is due to the cross inductance term, $L_{qd}^{i}$.

With regard to the voltage vector response $v_{qdc}^{i}$, various methods can be used to extract the pulsating voltage vector components $V_{qc}^{i}$ and $V_{dc}^{i}$ from Equation [17]. One simple and effective approach is achieved in Equation [18] by first transforming the voltage signal $v_{qdc}^{s}$ to the pulsation frame by multiplying by $e^{-j\theta_i}$ and then multiplying with the carrier $\cos \theta_c$ to convert the carrier components to DC. Then, low pass filtering can be employed to eliminate the asynchronous components— thereby providing estimates of voltage vector components $\hat{V}_{qc}^{i}$ and $\hat{V}_{dc}^{i}$ described according to:

$$\hat{V}_{qc}^{i} = j\hat{V}_{dc}^{i} = LPF\{2\cos\omega_c t v_{qdc}^{i}\} = LPF\{2\cos\omega_c t e^{-j\theta_i} v_{qdc}^{s}\} = \qquad [\text{Eqn. 18}]$$
$$LPF\{2\cos\omega_c t \omega_c(L_{qd}^{i} - jL_{d}^{i})I_c \cos\omega_c t\} =$$
$$\omega_c(L_{qd}^{i} - jL_{d}^{i})I_c LPF\{2\cos\omega_c t \cos\omega_c t\} =$$
$$\omega_c(L_{qd}^{i} - jL_{d}^{i})I_c LPF\{1 + \cos 2\omega_c t\} \approx \omega_c(L_{qd}^{i} - jL_{d}^{i})I_c.$$

While a specific method for extracting the pulsating voltage vector components $V_{qc}^{i}$ and $V_{dc}^{i}$ is set forth in Equation [18], it is recognized that other approaches can be used to obtain the high frequency signature. For example, other heterodyning methods, peak detection methods, slope measurement, synchronous frame filtering, or a second order generalized integrator can also be used for extracting the magnetic alignment signatures. The vector components $V_{qc}^i$ and $V_{dc}^i$ may provide or serve as the magnetic alignment signatures, according to an embodiment of the invention.

Also, according to additional embodiments, the magnetic alignment signatures can be extracted from a different orientation other than the current frame d-axis or the current frame q-axis. If the extraction is performed from a different orientation, the magnetic alignment signature will be a composite signature of both $L_{qd}^i$ and $L_d^i$. For example, the excitation frame d-axis signature can have $(L_{qd}^i \sin\theta_{ex} + L_d^i \cos\theta_{ex})$ and the excitation frame q-axis signature can have $(L_{qd}^i \cos\theta_{ex} + L_d^i \sin\theta_{ex})$, where $\theta_{ex}$ is the angle of the extraction frame relative to the current frame.

Having the current injection carrier selected to be $\sin\theta_c$, inductive voltage is extracted using the multiplication of $\cos\theta_c$. On the other hand, resistive voltage can also contain magnetic alignment signatures, and a resistive voltage term can be also extracted using a similar extraction method. More specifically, resistive voltage can be extracted by multiplying $\sin\theta_c$ to the carrier response.

Illustration of the operations performed and variables applied by the signal extractor 78 in Equations [17] and [18] are illustrated in the block diagram of FIG. 5B.

Figure 9A:
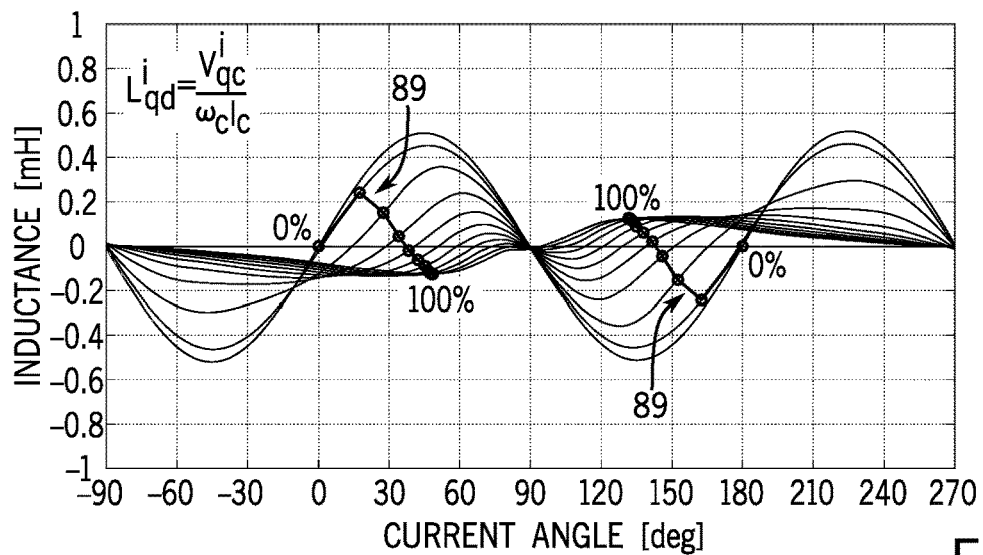
FIGS. 9A-9C are graphs illustrating characteristics of the magnetic alignment signatures resulting from d-axis current injections in the current frame, according to an embodiment of the invention.
Figure 9B:
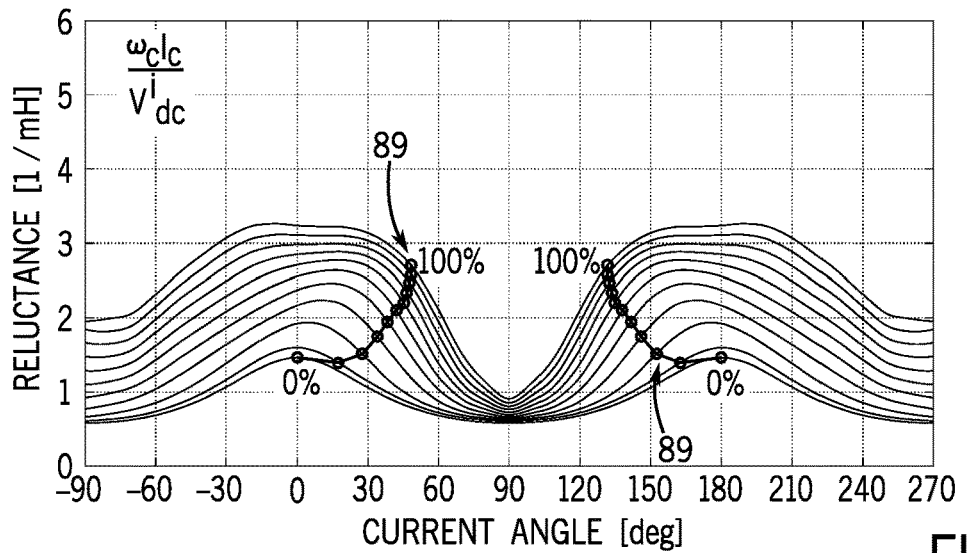
Figure 9C:
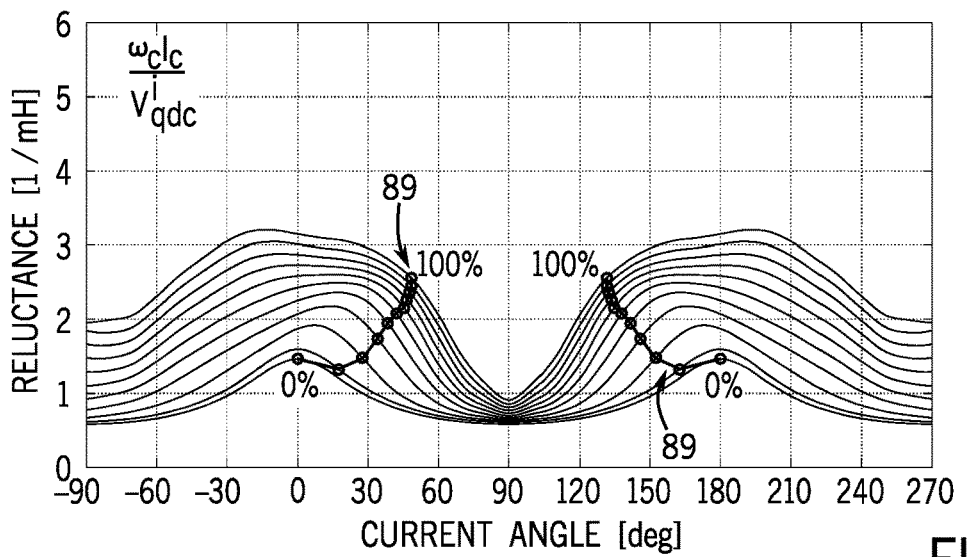

Profiles of the selected magnetic alignment signatures that can be extracted with a current frame d-axis current injection (being derived from Equations [17] and [18]) are illustrated in FIGS. 9A-9C for an exemplary IPM machine. For the extracted pulsating voltage vector components $V_{qc}^i$ and $V_{dc}^i$ and the current frame inductance values $L_d^i$ and $L_{qd}^i$ that are proportional thereto, it is recognized that $V_{qc}^i$ (which is proportional to $L_{qd}^i$) is very sensitive to current angle near 0% current, as illustrated in FIG. 9A, when the motor is operating at the MTPA operation point (MTPA operating line indicated at 89). However, as the current level approaches the range of 20~30%, sensitivity and range of $V_{qc}^i$ drops significantly, such that it is not an ideal magnetic alignment signature to track past this point. Conversely, $V_{dc}^i$, specifically $(\omega_c I_c)/V_{dc}^i$, which is the inverse of $L_d^i$, has strong sensitivity at a current level of 30% and above, as shown in FIG. 9B, such that $(\omega_c I_c)/V_{dc}^i$ can be used as an alternative magnetic alignment signature that may be tracked at current levels of 30% and above with sufficient sensitivity. As another alternative, $(\omega_c I_c)/V_{qdc}^i$ may also be utilized as the magnetic signature, as shown in FIG. 9C.

By combining both signatures $L_{qd}^i$ and $L_d^i$ or vector signature components $V_{qc}^i$ and $V_{dc}^i$, complete self-sensing or sensorless control can be achieved. However, the signature level of $1/L_d^i$ at the MTPA operation point is quite close to the maximum signature level. This may limit the dynamic performance of the self-sensing control and thus, in order to improve the dynamic performance as well as the sensitivity of the signatures, the current injection orientation can be rotated towards the q-axis of the current frame (qi-axis) for motoring operation and towards the negative q-axis of the current frame for braking operation, when the current level is high enough and when higher dynamic performance is required. This rotation angle $\theta_{comp}$, as provided/indicated in signal injector 72 of FIG. 5A, may be pre-programmed depending on the operating point and operating requirements of the AC electric machine. The rotating angle can also be increased in response to the magnetic alignment signature itself. That is, if the signature level gets close to its limit, the excitation angle can be increased to extend the sensitivity range. This way, the torque pulsation caused by the injection current can be maintained at a low level during steady state operation.

Another embodiment of the invention provides for high frequency signal injection in the form of a pulsating high frequency current signal with a variable injection angle. That is, the injection current angle can be adjusted by a compensation angle $\theta_{comp}$ in order to achieve a desired signature sensitivity, with the adjustment angle being described by:

$$i_{qdc}^i = i_{qc}^i - ji_{dc}^i = -jI_c \sin\omega_c t \, e^{j\theta_{comp}}$$

$$v_{qc}^i = I_c \sin\omega_c t \sin\theta_{comp}, v_{dc}^i = I_c \sin\omega_c t \cos\theta_{comp} \quad [\text{Eqn. 19}].$$

This injection is equivalent to a d-axis current injection of the pulsation frame, with the d-axis of the pulsation aligned on the angular position $(\theta_i + \theta_{comp})$. So the signature can be defined using the inductances in the pulsation frame as $L_{qd}^p$ and $L_d^p$ in the same manner by which the current frame signatures are derived in [Eqn. 17].

The signature extraction can be done in any frame and the orientation can be selected to improve the signature sensitivity. For example, if the current frame is used as the extraction frame, the adjustment of the injection current angle effectively produces a carrier voltage response according to:

$$v_{qdc}^i = v_{qc}^i - jv_{dc}^i = \omega_c I_c \begin{bmatrix} L_q^i & L_{qd}^i \\ L_{dq}^i & L_d^i \end{bmatrix} \begin{pmatrix} \sin\theta_{comp} \\ \cos\theta_{comp} \end{pmatrix} \cos\omega_c t \quad [\text{Eqn. 20}]$$

$$v_{qc}^i = \omega_c I_c \{L_q^i \sin\theta_{comp} + L_{qd}^i \cos\theta_{comp}\} \cos\omega_c t$$

$$v_{dc}^i = \omega_c I_c \{L_{dq}^i \sin\theta_{comp} + L_d^i \cos\theta_{comp}\} \cos\omega_c t$$

$$V_{qc}^i = \omega_c I_c \{L_q^i \sin\theta_{comp} + L_{qd}^i \cos\theta_{comp}\}$$

$$V_{dc}^i = \omega_c I_c \{L_{dq}^i \sin\theta_{comp} + L_d^i \cos\theta_{comp}\}.$$

At one extreme of this injection angle variation, the injection angle is 90° where current injection aligns with current frame q-axis. For such an injection angle variation, torque pulsation would be significantly increased, but the signal sensitivity would be greatly improved (for the exemplary IPM design at high torque).

In an embodiment where the high frequency signal is injected by signal injector 72 as a pulsating high frequency voltage signal, such as illustrated in the drive system of FIGS. 6A and 6B, the desired injection voltage $v_{qdc}^i$ can be represented as:

$$v_{qdc}^i = v_{qc}^i - jv_{dc}^i = -jV_c \cos\omega_c t$$

$$v_{qc}^i = 0, v_{dc}^i = V_c \cos\omega_c t \quad [\text{Eqn. 21}],$$

where $V_c$ is the magnitude of the high frequency voltage and $\omega_c$ is the pulsation frequency.

Here, the pulsation carrier angle $\omega_c t$ can be defined as a carrier angle variable $\theta_c$ and used for both signal injection and for signature extraction as shown in FIG. 6B, and can also be used in the current controller to support the carrier voltage current injection regulation as shown in FIG. 6A. Especially when the voltage injection carrier frequency doesn't have sufficient spectral separation from the current regulation bandwidth, current regulator is desired not to attenuate the injection voltage by creating a cancelling control effort for disturbance rejection. An injection voltage regulator can also be implemented, using the carrier angle $\theta_c$.

Figure 10:
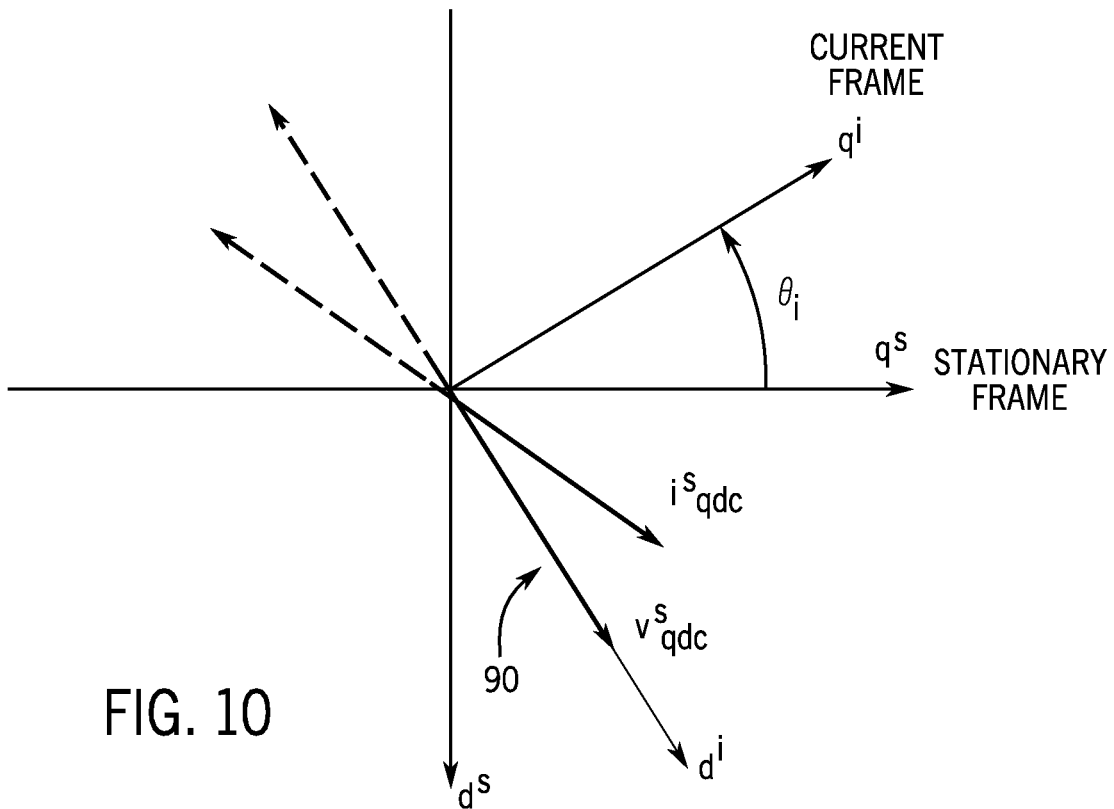
FIG. 10 is a graph illustrating injection of a pulsating, high frequency voltage signal on the current reference frame, according to an embodiment of the invention.

As illustrated in FIG. 10, in the stationary reference frame, this pulsating vector 90 can be written as $$v_{qdc}^s = -jV_c \cos\omega_c t \, e^{j\theta_i} = V_c \cos\omega_c t(-\sin\theta_i + j\cos\theta_i) \quad [\text{Eqn. 22}],$$

where $\theta_i$ is the angular position of the current vector in reference to the stator q-axis. Illustration of the operations performed and variables applied by the signal injector 72 in Equations [19] and [20] are illustrated in the block diagram of FIG. 6B.

Upon injection of a pulsating high frequency voltage signal by signal injector 72, a carrier current response can be derived according to:

$$i_{qdc}^i = i_{qc}^i - ji_{dc}^i = \frac{V_c}{\omega_c}(\mathcal{R}_{qd}^i - j\mathcal{R}_d^i)\sin\omega_c t \quad [\text{Eqn. 23}]$$

$$i_{qc}^i = \frac{V_c}{\omega_c}\mathcal{R}_{qd}^i \sin\omega_c t,$$

$$i_{dc}^i = \frac{V_c}{\omega_c}\mathcal{R}_d^i \sin\omega_c t$$

$$I_{qc}^i = \frac{V_c}{\omega_c}\mathcal{R}_{qd}^i,$$

$$I_{dc}^i = \frac{V_c}{\omega_c}\mathcal{R}_d^i$$

$$I_{qdc}^i = |I_{qc}^i - jI_{dc}^i| = \frac{V_c}{\omega_c}|\mathcal{R}_{qd}^i - j\mathcal{R}_d^i|.$$

From the measured carrier current response $i_{qdc}^i$, the current frame d-axis reluctance $\mathcal{R}_d^i$ and the pulsating frame cross reluctance $\mathcal{R}_{qd}^i$ can be estimated.

It is noted that, while the injection voltage is aligned to the d-axis of the current frame, the carrier current response had a q-axis component, which is due to the cross inductance term. This can increase the torque pulsation during MTPA operation.

With regard to the current carrier response $i_{qdc}^i$, various methods can be used to extract the pulsating current vector components $I_{qc}^i$ and $I_{dc}^i$. One simple and effective approach is achieved in Equation [24] by first transforming the current signal $i_{qdc}^i$ to the pulsation frame by multiplying by $e^{-j\theta_i}$ and then multiplying with the carrier $\sin\theta_c$ to convert the carrier components to DC. Then, low pass filtering can eliminate the asynchronous components, providing estimates of current vector components $\hat{I}_{qc}^i$ and $\hat{I}_{dc}^i$ as described according to:

$$\hat{I}_{qc}^i - j\hat{I}_{dc}^i = LPF\{2\sin\omega_c t i_{qdc}^i\} = LPF\{2\sin\omega_c t e^{-j\theta_i} i_{qdc}^s\} = \quad [\text{Eqn. 24}]$$

$$LPF\left\{2\sin\omega_c t \frac{V_c}{\omega_c}(\mathcal{R}_{qd}^i - j\mathcal{R}_d^i)\sin\omega_c t\right\} =$$

$$\frac{V_c}{\omega_c}(\mathcal{R}_{qd}^i - j\mathcal{R}_d^i)LPF\{2\sin\omega_c t \sin\omega_c t\} =$$

$$\frac{V_c}{\omega_c}(\mathcal{R}_{qd}^i - j\mathcal{R}_d^i)LPF\{1 - \cos 2\omega_c t\} \approx$$

$$\frac{V_c}{\omega_c}(\mathcal{R}_{qd}^i - j\mathcal{R}_d^i).$$

Illustration of the operations performed and variables applied by the signal extractor 78 in Equations [21] and [22] are illustrated in the block diagram of FIG. 6B.

Figure 11A:
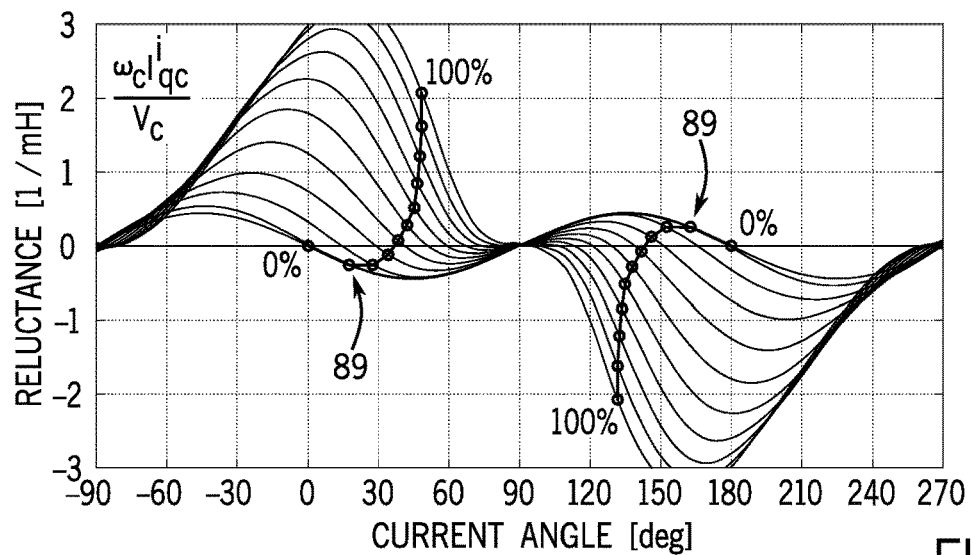
FIGS. 11A-11C are graphs illustrating Characteristics of the Current Frame d-axis Voltage Injection Signatures of an IPM machine, according to an embodiment of the invention.
Figure 11B:
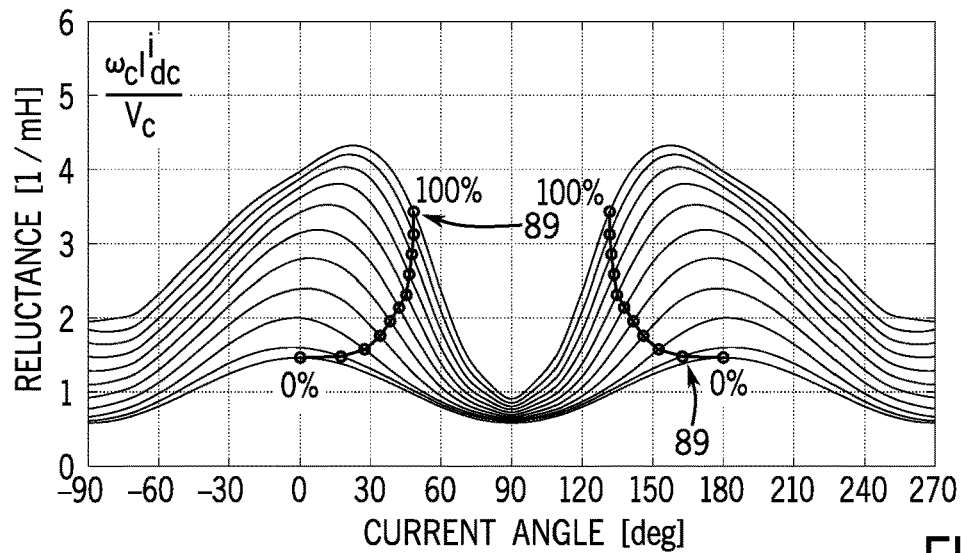
Figure 11C:
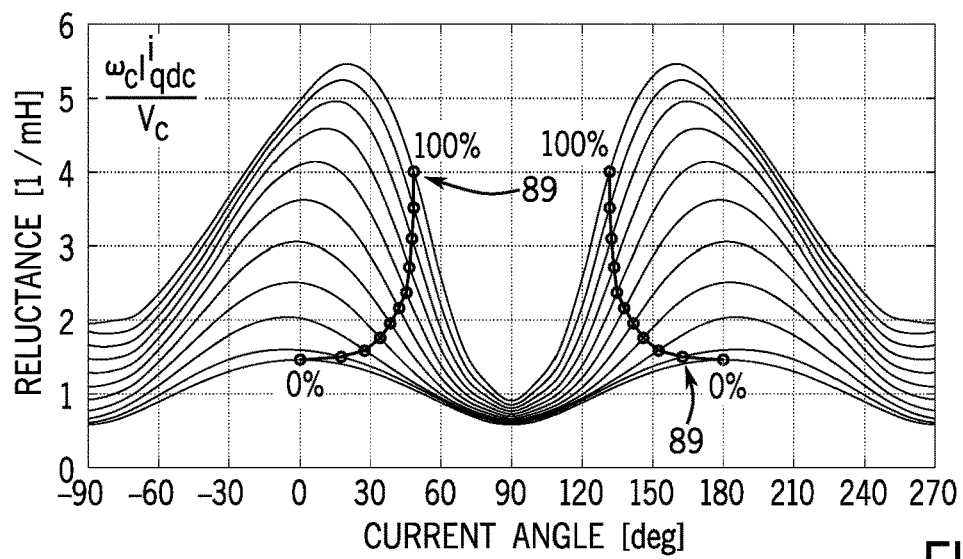

Profiles of the selected magnetic alignment signatures that can be extracted with a current frame d-axis voltage injection (being derived from Equations [23] and [24]) are illustrated in FIGS. 11A-11C for an exemplary IPM machine. For the current frame d-axis voltage injection, unlike the current injection, current frame q-axis carrier current component $I_{qc}^i$ deviates from zero at MTPA points due to the cross reluctance term $\mathcal{R}_{qd}^i$ and its sensitivity to q-axis saturation and cross saturation effect, with it being seen in FIG. 11A that, near zero current level, where the di-axis current component $I_{dc}^i$ doesn't have sensitivity, the qi-axis component $I_{qc}^i$ provides good sensitivity. Also, for higher current level, the sensitivity range of $I_{qc}^i$ is extended significantly around MTPA points. As shown in FIG. 11B, for medium current level, 20~50% in this example, sensitivity of $I_{qc}^i$ has limited range, so use of $I_{dc}^i$ component would be preferred. As shown in FIG. 11C, except for the zero and low current levels, use of carrier current component magnitude $I_{qdc}^i$ is a good magnetic alignment signature option because it combines the strength of both qi-axis and di-axis carrier current components nicely.

Figure 12:
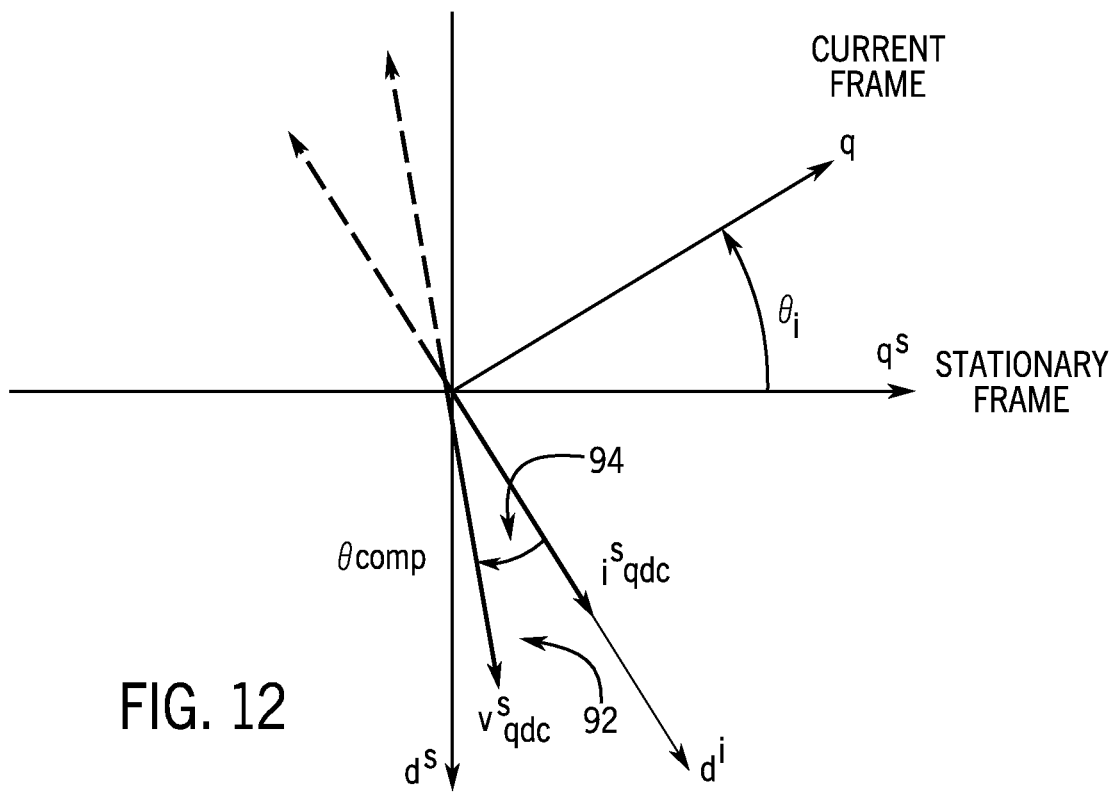
FIG. 12 is a graph illustrating injection of a pulsating, high frequency, phase compensated current signal on a current reference frame, according to an embodiment of the invention.

Another embodiment of the invention provides for high frequency signal injection in the form of a pulsating high frequency voltage signal with angle compensation, as illustrated in FIG. 12. That is, the injection voltage angle of pulsating vector 92 can be adjusted or profiled by a compensation angle $\theta_{comp}$ 94 according to:

$$v_{qdc}^i = v_{qc}^i - jv_{dc}^i = -jV_c \cos\omega_c t \, e^{j\theta_{comp}}$$

$$v_{qc}^i = V_c \cos\omega_c t \sin\theta_{comp}, v_{dc}^i = V_c \cos\omega_c t \cos\theta_{comp} \quad [\text{Eqn. 25}].$$

The adjustment of the injection voltage angle effectively produces a current injection tangential to the main current vector according to:

$$\theta_{comp} = -\tan^{-1}\left(\frac{L_{qd}^i}{L_d^i}\right). \quad [\text{Eqn. 26}]$$

Beneficially, adjustment of the injection voltage angle by a compensation angle $\theta_{comp}$ results in reduced torque pulsation.

This adjusted angle injection is equivalent to a d-axis voltage injection of the pulsation frame with d-axis of the pulsation aligned on the angular position $(\theta_i + \theta_{comp})$ So the signature can be defined using the reluctance in the pulsating frame as $\mathcal{R}_{qd}^p$ and $\mathcal{R}_d^p$ in the same manner current by which frame signatures are derived in [Eqn. 24]. The signature extraction can be done in any frame and the orientation can be selected to improve the signature sensitivity. For example, if the current frame is used as the extraction frame, the carrier current response can be derived as:

$$i_{qdc}^i = i_{qc}^i - ji_{dc}^i = \frac{V_c}{\omega_c}\begin{bmatrix}\mathcal{R}_q^i & \mathcal{R}_{qd}^i \\ \mathcal{R}_{dq}^i & \mathcal{R}_d^i\end{bmatrix}\begin{Bmatrix}\sin\theta_{comp} \\ \cos\theta_{comp}\end{Bmatrix}\sin\omega_c t \quad [\text{Eqn. 27}]$$

$$i_{qc}^i = \frac{V_c}{\omega_c}\{\mathcal{R}_q^i\sin\theta_{comp} + \mathcal{R}_{qd}^i\cos\theta_{comp}\}\sin\omega_c t$$

$$i_{dc}^i = \frac{V_c}{\omega_c}\{\mathcal{R}_{dq}^i\sin\theta_{comp} + \mathcal{R}_d^i\cos\theta_{comp}\}\sin\omega_c t$$

$$I_{qc}^i = \frac{V_c}{\omega_c}\{\mathcal{R}_q^i\sin\theta_{comp} + \mathcal{R}_{qd}^i\cos\theta_{comp}\}$$

$$I_{dc}^i = \frac{V_c}{\omega_c}\{\mathcal{R}_{dq}^i\sin\theta_{comp} + \mathcal{R}_d^i\cos\theta_{comp}\}$$

$$I_{qdc} = |I_{qc}^i - jI_{dc}^i| =$$

$$\frac{V_c}{\omega_c}|(\mathcal{R}_q^i - j\mathcal{R}_{dq}^i)\sin\theta_{comp} + (\mathcal{R}_{qd}^i - j\mathcal{R}_d^i)\cos\theta_{comp}|.$$

Figure 13A:
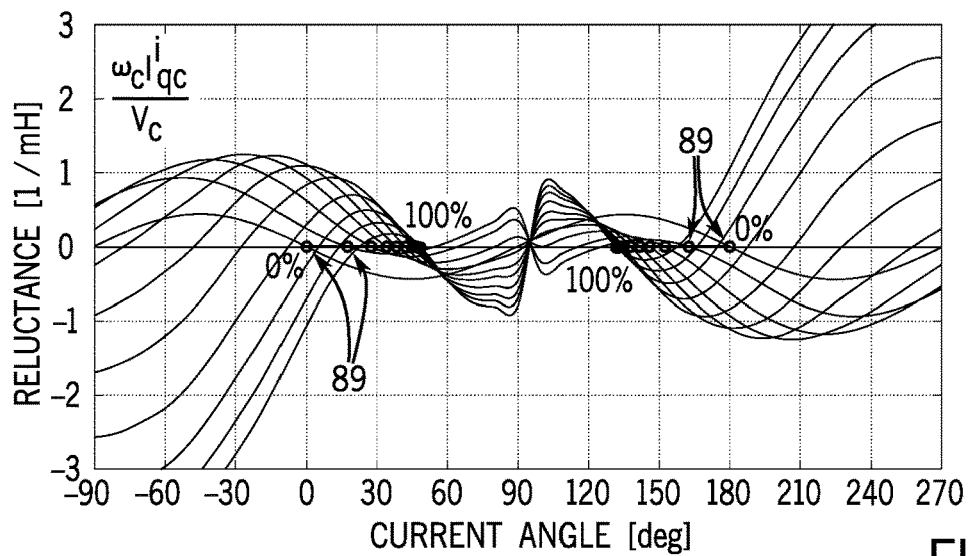
FIGS. 13A-13C are graphs illustrating Characteristics of the Angle Compensated Current Frame Voltage Injection Signatures of an IPM machine with Carrier Current aligned on di-axis at MTPA points, according to an embodiment of the invention.
Figure 13B:
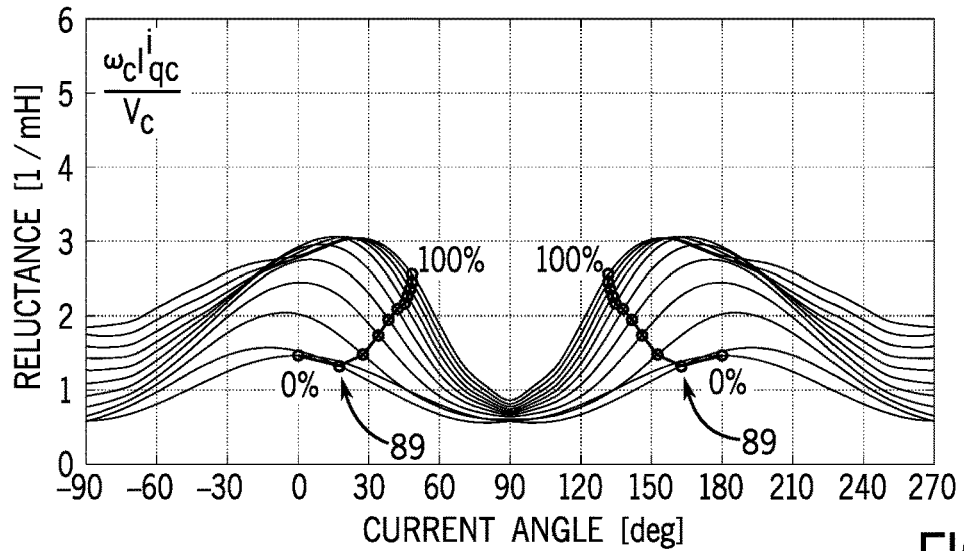
Figure 13C:
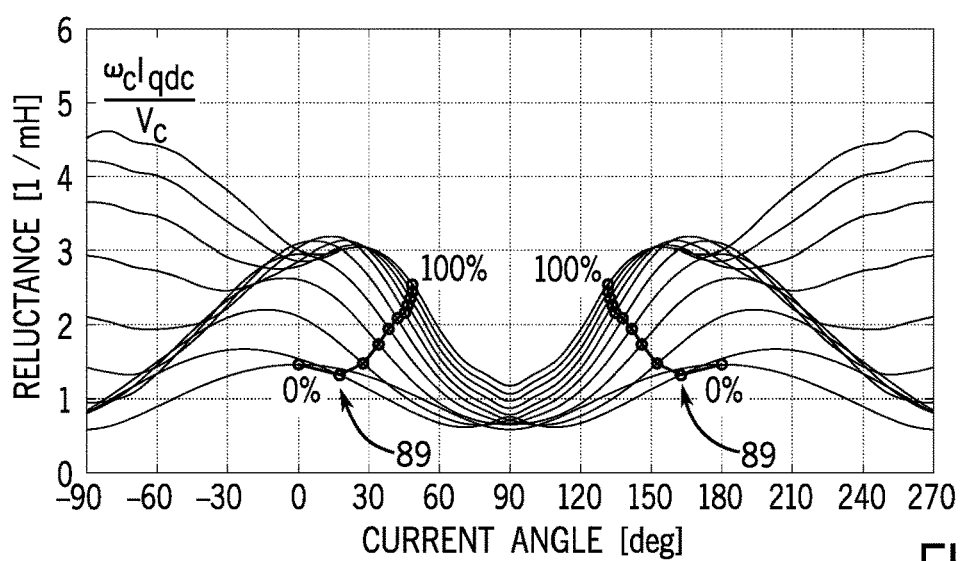

As illustrated in FIGS. 13A-13C, the voltage compensation angle $\theta_{comp}$ may be profiled to produce minimum torque pulsation at the MTPA operation. Therefore, the qi-axis carrier current component $I_{qc}{}^i$ is zero for all the MTPA operating points 89, as shown in FIG. 13A. However, as shown in FIGS. 13B and 13C, sensitivity of the reluctance signature and $(\omega_c I_{qc}{}^i)/V_c$ and $(\omega_c I_{qdc})/V_c$ is significantly reduced, with it being recognized that torque pulsation can be allowed to increase by increasing the qi-axis current, in order to improve the sensitivity of the signatures.

It can therefore be seen that extraction of a magnetic alignment signature is enabled based on injection of a high frequency carrier signal onto the primary excitation current. As can be seen from Equations [17]-[18], [19]-[20], [21]-[22], and [25]-[27] above, the signature derived is dependent on the high frequency injection method employed—with it being recognized that, for example, d-axis inductance or reluctance in the current frame, $L^i{}_d$, $\mathcal{R}^i{}_d$, may be measured as the signature. The extracted signature may thus generally be designated as a magnetic alignment signature m, which— as indicated above—may refer to vector signatures or scalar component signatures in a selected extraction frame.

Figure 14A:
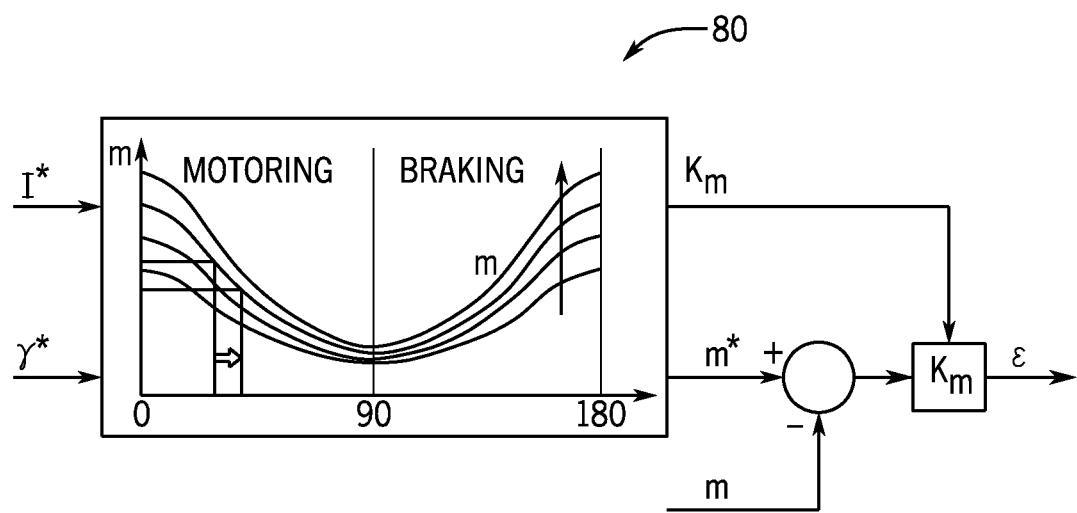
FIG. 14A is a block diagram of a magnetic alignment error estimation using a forward mapping technique, implemented by the magnetic alignment error estimator of FIGS. 5B and 6B, according to an embodiment of the invention.

As seen in each of FIGS. 5B and 6B and now also in FIG. 14A, upon extraction of a desired magnetic alignment signature, the signature value is provided to magnetic alignment error estimator 80 (along with the operating point (I, γ))—with the magnetic alignment signature being indicated as voltage vector components $\hat{V}_{qc}{}^i$ and $\hat{V}_{dc}{}^i$ in FIG. 5B (allowing for estimation of the current frame d-axis inductance $L^i{}_d$ and the pulsating frame cross inductance $L^i{}_{qd}$), as current vector components $\hat{I}_{qc}{}^p$ and $\hat{I}_{dc}{}^p$ in FIG. 6B (allowing for estimation of the current frame d-axis reluctance $\mathcal{R}^i{}_d$ and the pulsating frame cross reluctance $\mathcal{R}^i{}_{qd}$, and generally as m in FIG. 14A. Via magnetic alignment error estimator 80, the characteristics of the selected magnetic alignment signature m (or m*) can be used to estimate a magnetic alignment error ε, with it being recognized that various methods can be used to estimate the magnetic alignment signature, including methods for estimating both vector and scalar signatures.

Figure 15:
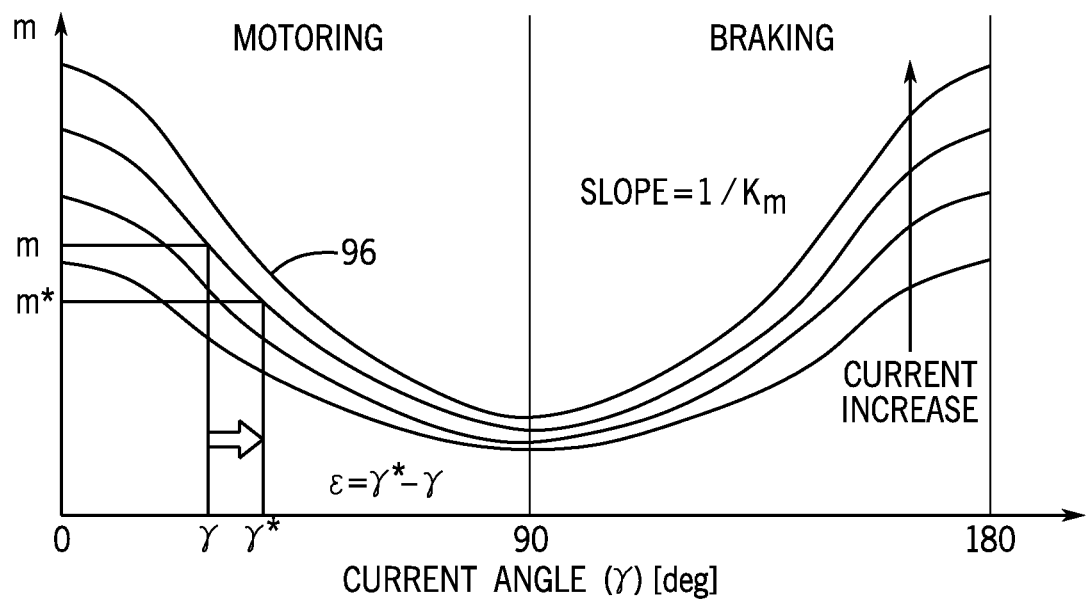
FIG. 15 is a graph illustrating estimation of a magnetic alignment error from the magnetic alignment signature using a forward mapping technique, according to an embodiment of the invention.

The magnetic alignment signature m can be characterized for the range of operating points (I, γ) as well as for the selected excitation method described previously. Physical modeling and analysis can be used to produce the characteristics or experimental calibration can be used as well. Even though an operating point lies in a 2-dimensional space of (I, γ), typically, desired operation resides on a single line in the space that meets certain requirements, such as maximum torque per ampere (MTPA). Therefore, the mapping doesn't need to cover the entire 2-dimensional space— assuming that, during operation, (I, γ), is maintained sufficiently close to (I*, γ*). As shown in FIG. 15, given the operating point (I, γ) with current angle γ, the desired signature value m* as well as the desired signature error gain $K_m$ is produced from the mapping 96—with FIG. 15 illustrating that the signature error gain $K_m$ is the inverse of the slope of the mapping, i.e., slope=$1/K_m$.

Figure 14B:
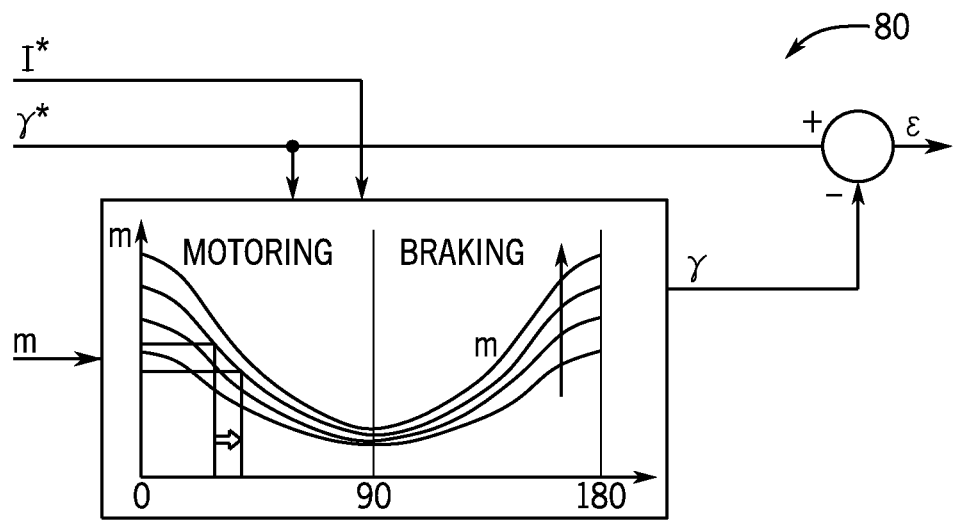
FIG. 14B is a block diagram of a magnetic alignment error estimation using an inverse/reverse mapping technique, implemented by the magnetic alignment error estimator of FIGS. 5B and 6B, according to an embodiment of the invention.

The above described approach (in FIG. 14A) utilizes a forward mapping for the signature profile to create an error from the signature error. This approach is effective when the magnetic alignment error ε is small, and therefore the linear approximation of the profile is sufficient. However, when the error perturbation is large, inverse mapping can be utilized to generate the estimated magnetic alignment γ from the signature value m, such as illustrated in FIG. 14B, with it being recognized that 2-dimensional or vector mapping may be used. In order to properly perform the inverse mapping, sections such as motoring and braking should be determined based on other signals such as commanded current angle, because the inverse mapping can have multiple inverse mapping points depending on the signature characteristics.

As shown in FIGS. 5A, 5B, 6A, 6B, the magnetic alignment error ε is output from error estimator 80 and provided to position observer 82, with it being recognized that there are various options of using the estimated magnetic alignment error ε for self-sensing control. This error can be used to directly drive the current excitation angle $\theta_i$ forward or backwards for direct magnetic alignment control. One reasonable approach is to use the error to drive an observer regulator in position observer 82 to estimate the rotor angular position $\hat{\theta}_r$. The observer regulator can be implemented as a PI regulator, with a second order integral term of the error being added on top of the PI regulator in improve the ramping tracking capability. The observer regulator can also drive an integrator, with a combination of the observer regulator and the integrator being equivalent to a PLL (Phase Locked Loop). One simple alternative approach is directly using the low pass filtered magnetic alignment error signal, and adding it to the previous current angle γ or the rotor angle to determine the next current angle or the rotor position $\hat{\theta}_r$. This estimated electrical rotor angular position $\hat{\theta}_r$ may be fed back to the torque and flux controller 68, current controller 70 and signal injector 72 to provide sensorless control of the AC electric machine 64.

So far, pulsation signal injection has been described as a sinusoidal waveform injection. However, other waveforms such as square wave can be used as well. Typically, in practice, the injection signal is implemented using pulse width modulation (PWM) of switches (not shown) in the power converter 66. Since a PWM voltage source inverter constructs the output voltage vector using a finite number of switching states, with which for example 6 different voltage vectors and a zero voltage vector can be produced using a 2-level 3-phase inverter, the time waveform of the actual carrier injection vector may not have the obvious magnitude and orientation of the desired carrier injection vector at any instant of time. However, in an average sense over a modulation period, the desired orientation and the magnitude of the carrier injection can be achieved. Moreover, as the injection frequency is increased closer to the PWM frequency, the injection waveform will be composed of fewer number of PWM cycles. To an extreme, injection frequency can be identical to the PWM switching frequency, where the leading half of the PWM cycle and the latter half of the PWM cycle have different command value, leading to a pulsating injection at the PWM switching frequency. In a strict sense, the carrier injection signal will not look like a sinusoid or a 1-dimensional square wave as the injection frequency gets closer to the PWM switching frequency. However, proper sampling and filtering technique will help reduce the switching harmonics to a degree that the same concept of magnetic alignment signature extraction is applicable even to a case where the injection frequency is same as the PWM frequency.

Thus, as set forth in detail above, embodiments of the invention thus provide a system and method for self-sensing control of an electrical machine, where specific methods for injecting a high frequency carrier and measuring/analyzing magnetic alignment signatures may be employed, with preferred injection methods and preferred magnetic alignment signatures that are chosen being dependent on the operating point of the AC electric machine and on the dynamic state of the machine, so as to improve and maximize the performance of the position estimation.

In one form of injecting a pulsating high frequency current signal, the signal may be injected on the current frame as either a d-axis injection, q-axis injection, switching d-axis/q-axis injection, or a profiled angle injection. For a pulsating current frame d-axis current injection, magnetic alignment signatures may be measured in the form of current frame cross inductance $L^i_{qd}$ and a current frame d-axis inductance $L^i_d$, with the di-axis current injection resulting in low torque pulsation in the electric machine. Between these two magnetic alignment signatures, good magnetic alignment sensitivity can be established up to medium or fair sensitivity at high torque level. For a pulsating current frame q-axis current injection, magnetic alignment signatures may be measured in the form of current frame cross inductance $L^i_{qd}$ and a current frame q-axis inductance $L^i_q$, each having good signal strength and sensitivity, with the q-axis injection resulting in a higher torque pulsation in the electric motor. Both methods can be blended by a switching d-axis/q-axis injection or by profiling the injection angle depending on the current or torque level. For the blended approaches, the signatures are either measured conditionally or are blended with each other.

In one form of injecting a pulsating high frequency voltage signal, the signal may be injected on the current frame as either a d-axis injection, q-axis injection, switching d-axis/q-axis injection, or a profiled angle injection. For a pulsating current frame d-axis voltage injection, magnetic alignment signatures may be measured in the form of current frame cross inductance $\mathcal{R}^i_{qd}$ and a current frame d-axis inductance $\mathcal{R}^i_d$. Between these two magnetic alignment signatures, good magnetic alignment sensitivity can be established up to medium or fair sensitivity at high torque level. For a pulsating current frame q-axis voltage injection, magnetic alignment signatures may be measured in the form of current frame cross inductance $\mathcal{R}^i_{dq}$ and a current frame q-axis inductance $\mathcal{R}^i_q$, each having good signal strength and sensitivity, with the q-axis injection resulting in a higher torque pulsation in the electric motor. Both methods can be blended by a switching d-axis/q-axis injection or by profiling the injection angle depending on the current or torque level. For the blended approaches, the signatures are either measured conditionally or are blended with each other. One special example for the profiled injection angle approach would be a minimum torque ripple approach at MTPA points, where the injection angle is profiled in a way that minimizes the torque ripple at the MTPA operating point.

Figure 16:
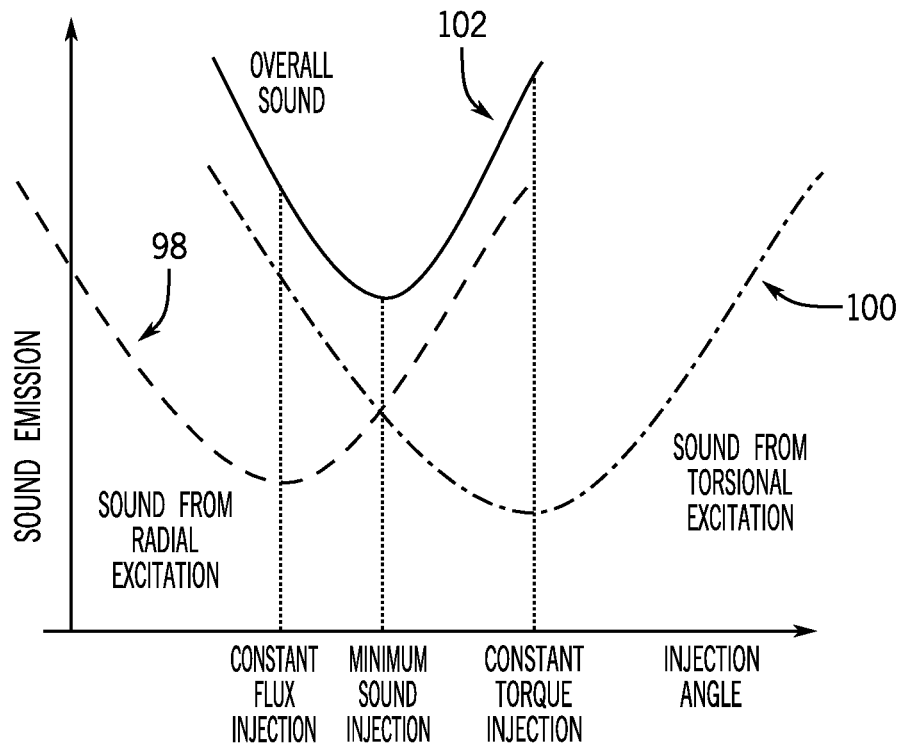
FIG. 16 is a graph illustrating sound emission profiles from radial excitation and torsional excitation relative to a constant flux injection, constant torque injection, and optimized noise reduction injection, according to an embodiment of the invention.

With respect to the injection of a pulsating high frequency voltage signal or current signal (and the measurement of a resulting magnetic alignment signature) according to any of the techniques described above, it is recognized that injection of such a carrier signal may generate significant noise and vibration in the electric machine. That is, noise and vibration in the electric machine can be generated from torsional excitation as well as radial excitation, with radial excitation and associated noise/vibration being low when the signal injection orientation is aligned along a constant flux contour and torsional excitation and associated noise/vibration being low when the signal injection orientation is aligned along a constant torque contour. Curves for sound emission from radial excitation and torsional excitation relative to a constant flux injection and constant torque injection are shown in FIG. 16, as indicated via curves 98 and 100, respectively. Thus, it would be desirable to control injection of the pulsating high frequency voltage/current signal in order to minimize noise and vibration in the electric machine, while still having the voltage/current signal generate a magnetic alignment signature of sufficient strength and sensitivity to allow for self-sensing control of the electric machine.

According to embodiments of the invention, a technique may be performed—such as by the signal injector 72 of FIGS. 5A, 5B, 6A and 6B—where a high frequency injection signal orientation (and injection frequency) may be chosen that provides reduced noise/vibration, while providing enough sensitivity necessary for self-sensing of the electric machine. In choosing a high frequency injection signal orientation (and injection frequency) that provides reduced noise/vibration, it is recognized that when the signal injection orientation is aligned along the constant torque contour, then the torsional excitation is minimized but the radial excitation can be significantly large, and conversely that when the signal injection orientation is aligned along the constant flux contour, radial excitation is minimized but the torsional excitation can be significantly large. Thus, according to embodiments of the invention, a high frequency injection signal orientation/angle (and injection frequency) may be selected that falls between the constant torque orientation and the constant flux orientation in order to minimize overall noise or vibration generation—as generally indicated by curve 102 in FIG. 16—with the orientation/angle being optimized depending on the noise/vibration transmission path characteristics such as torsional resonances, radial resonances, etc.

Figure 17A:
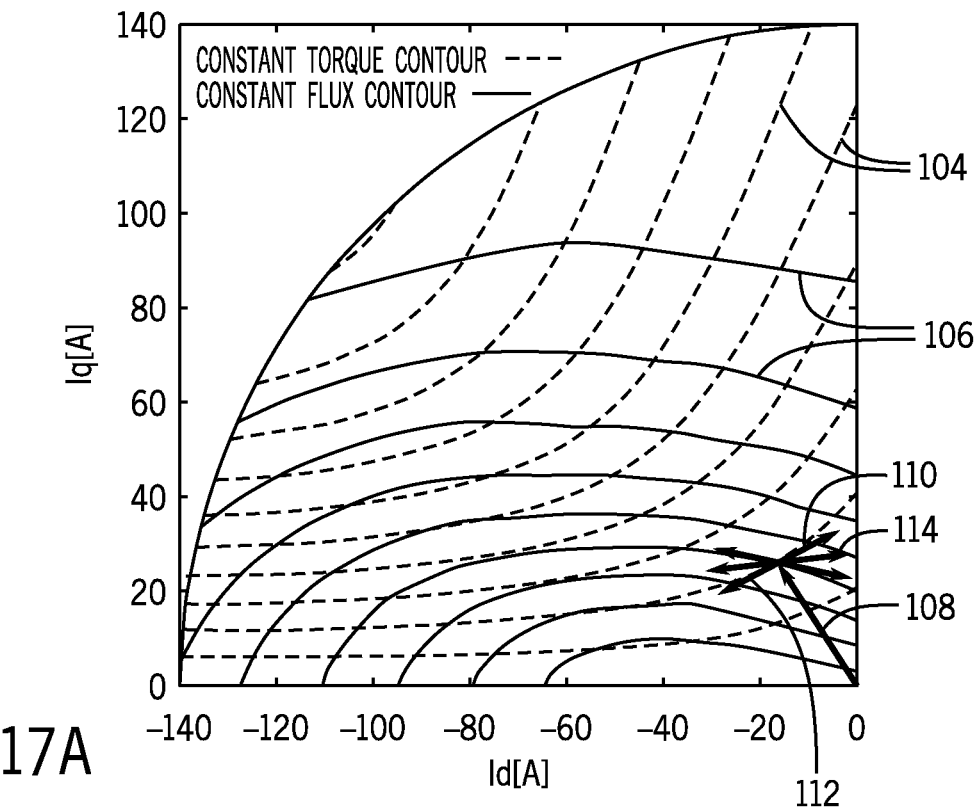
FIGS. 17A and 17B are graphs illustrating constant torque contours and constant flux contours relative to current axes $I_q$, $I_d$ for a low torque operation and a high torque operation of an electric machine, respectively.
Figure 17B:
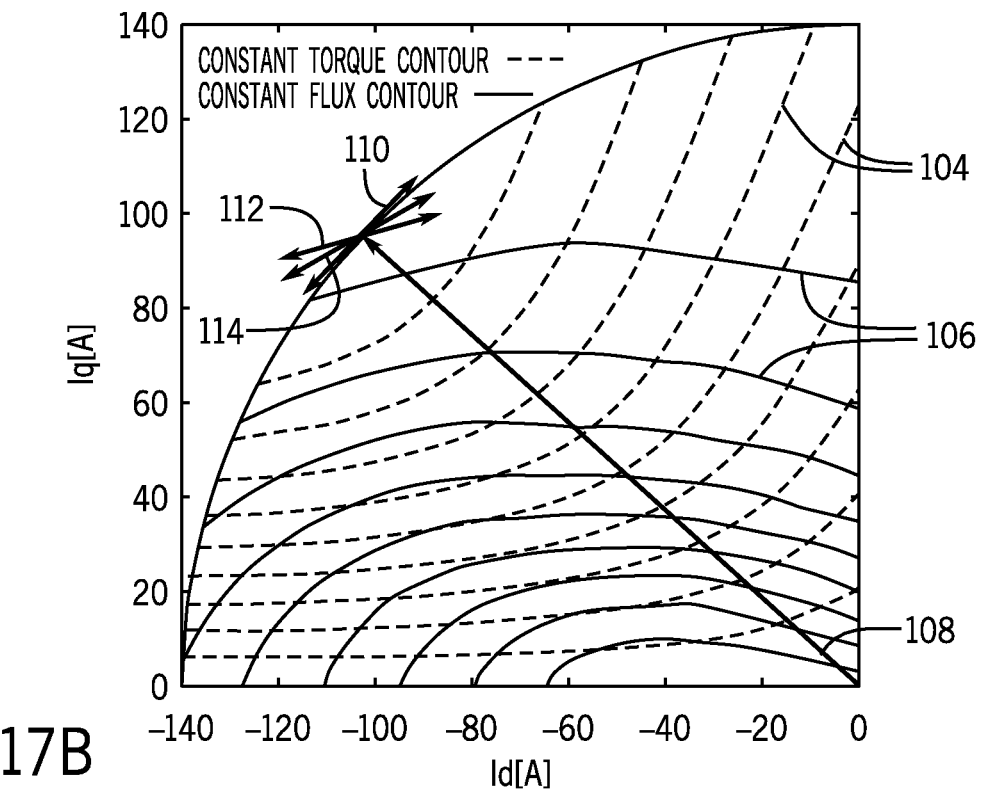

Referring now to FIGS. 17A and 17B, constant torque contours 104 and constant flux contours 106 are illustrated relative to current axes $I_q$, $I_d$ for a low torque operation (e.g., 20A) and high torque operation (e.g., 140A) of an electric machine, respectively. The low torque and high torque operations are illustrated by a current vector 108 having a desired magnitude and angle. For the high frequency signal injection provided by signal injector 72 (FIG. FIGS. 5A, 6A), a potential constant torque injection (i.e., injection aligned along a constant torque contour) is indicated by arrow 110, while a potential constant flux injection (i.e., injection aligned along a constant flux contour) is indicated by arrow 112. As previously stated, if the signal injection is aligned along the constant torque contour 104, then the torsional excitation is minimized but the radial excitation can be significantly large, and conversely if the signal injection orientation is aligned along the constant flux contour 106, radial excitation is minimized but the torsional excitation can be significantly large. Thus, according to embodiments of the invention, the orientation/angle of the signal injection may be optimized to be injected in the middle of a constant flux injection 110 and constant torque injection 112, as indicated by arrow 114, so as to minimize noise and vibration in the electric machine.

Figure 18A:
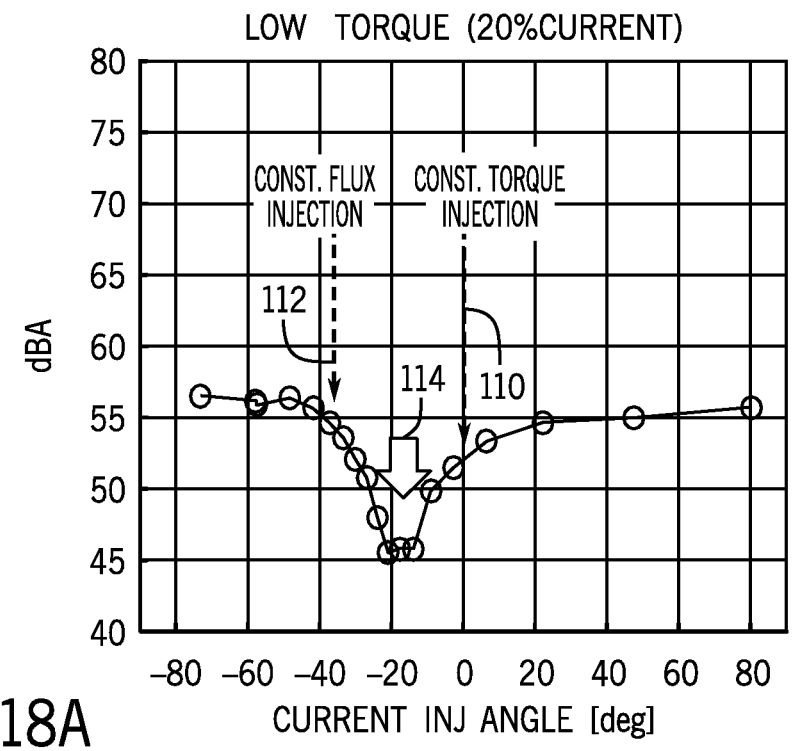
FIGS. 18A and 18B are graphs illustrating the audible noise profiles generated by each of a constant torque injection angle, constant flux injection angle, and optimized noise reduction injection angle at a middle of the constant flux contour and constant torque contour angles for the low torque and high torque operations of FIGS. 17A and 17B, respectively, according to an embodiment of the invention.
Figure 18B:
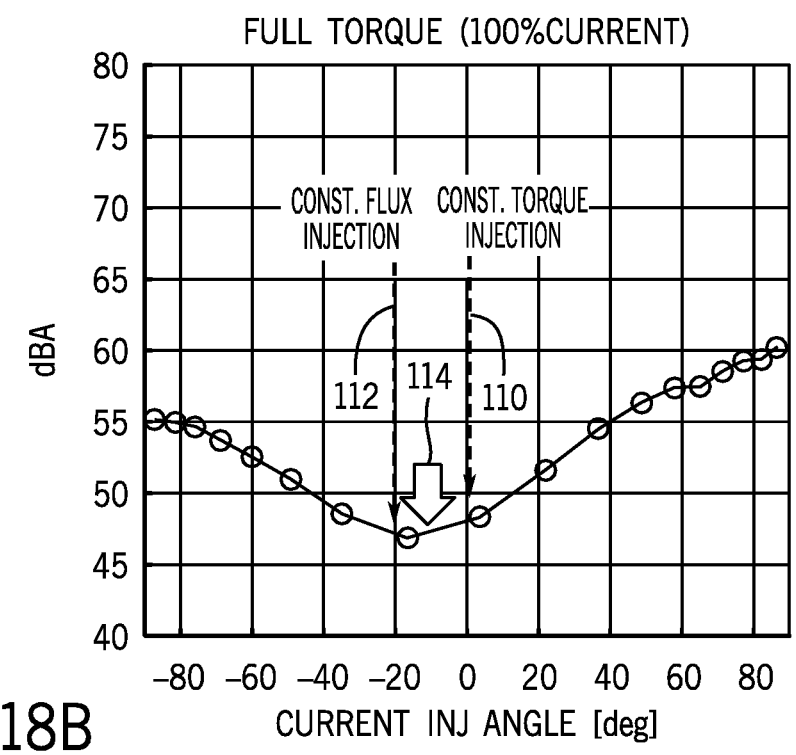

Referring now to FIGS. 18A and 18B, the audible noise profiles generated by each of the constant torque injection 110, the constant flux injection 112, and the injection 114 at a middle of the constant flux contour and constant torque contour (i.e., at an orientation/alignment midway between the indicated constant torque and flux vector orientations/alignments) are shown for the low torque and high torque operations of FIGS. 17A and 17B, respectively. As can be seen in FIG. 18A for the low torque level operation, for a signal injection 112 aligned along the constant flux contour 106 (e.g., at around −35°) the audible noise is approximately 55 dB, while for a signal injection 110 aligned along the constant torque contour 104 (e.g., at around 0°) the audible noise is approximately 53 dB. These values are compared to an audible noise level of approximately 46 dB that is achievable when the signal injection 114 is oriented at angle midway between the constant flux contour 104 and constant torque contour 106 alignments (e.g., around −18°). As can be seen in FIG. 18B for the high torque level operation, for a signal injection 112 aligned along the constant flux contour 106 (e.g., at around −35°) the audible noise is approximately 55 dB, while for a signal injection 110 aligned along the constant torque contour 104 (e.g., at around 0°) the audible noise is approximately 53 dB. These values are compared to an audible noise level of approximately 46 dB that is achievable when the signal injection 114 is oriented at angle midway between the constant flux contour and constant torque contour alignments (e.g., around −18°).

Figure 19A:
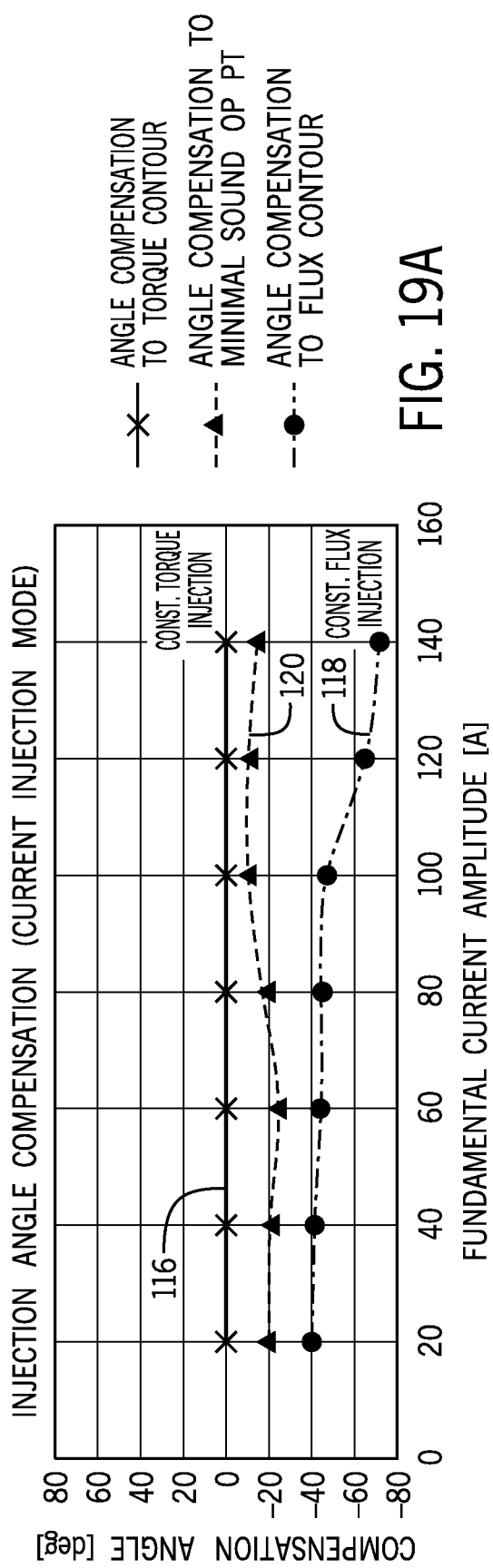
FIGS. 19A and 19B are graphs illustrating exemplary profiles for current injection orientation and voltage/flux injection orientation, respectively, across an operating range of the electric machine that produce minimum sound during operation of an electric machine, according to an embodiment of the invention.
Figure 19B:
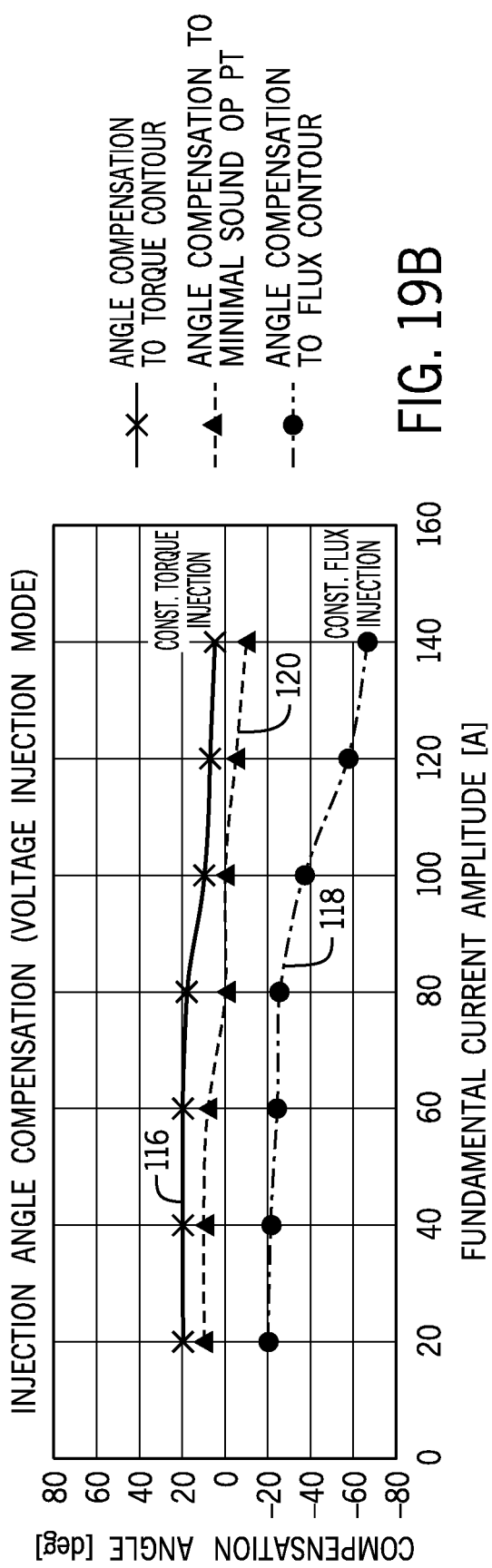

Referring now to FIGS. 19A and 19B, plots are provided that illustrate exemplary profiles for current injection orientation (FIG. 19A) and voltage/flux injection orientation (FIG. 19B) across an operating range of the electric machine that produce minimum sound during operation of an electric machine. As first shown in FIG. 19A for a current injection, for an operating range of the electric machine, a constant torque injection 116 is provided as an injection tangential to the primary current vector (i.e., at 0°), while a constant flux injection 118 has a negative or lagging angle that varies based on the current magnitude. It is further shown that a high frequency current injection 120 having an angle compensation applied thereto to achieve noise/vibration minimization has a negative/lagging angle and varies based on the current magnitude. As next shown in FIG. 19B for a voltage injection, for an operating range of the electric machine, a constant torque injection 116 is provided as an injection with a positive or leading angle (in order to achieve a tangential current injection), while a constant flux injection 118 has a negative or lagging angle that varies based on the current magnitude. It is further shown that an angle compensation applied to the high frequency voltage injection to achieve noise/vibration minimization has either a positive/leading angle or a negative/lagging angle based on the current magnitude—with a positive/leading angle being optimal at a low torque operation and a negative/lagging angle being optimal at a high torque operation.

Figure 20A:
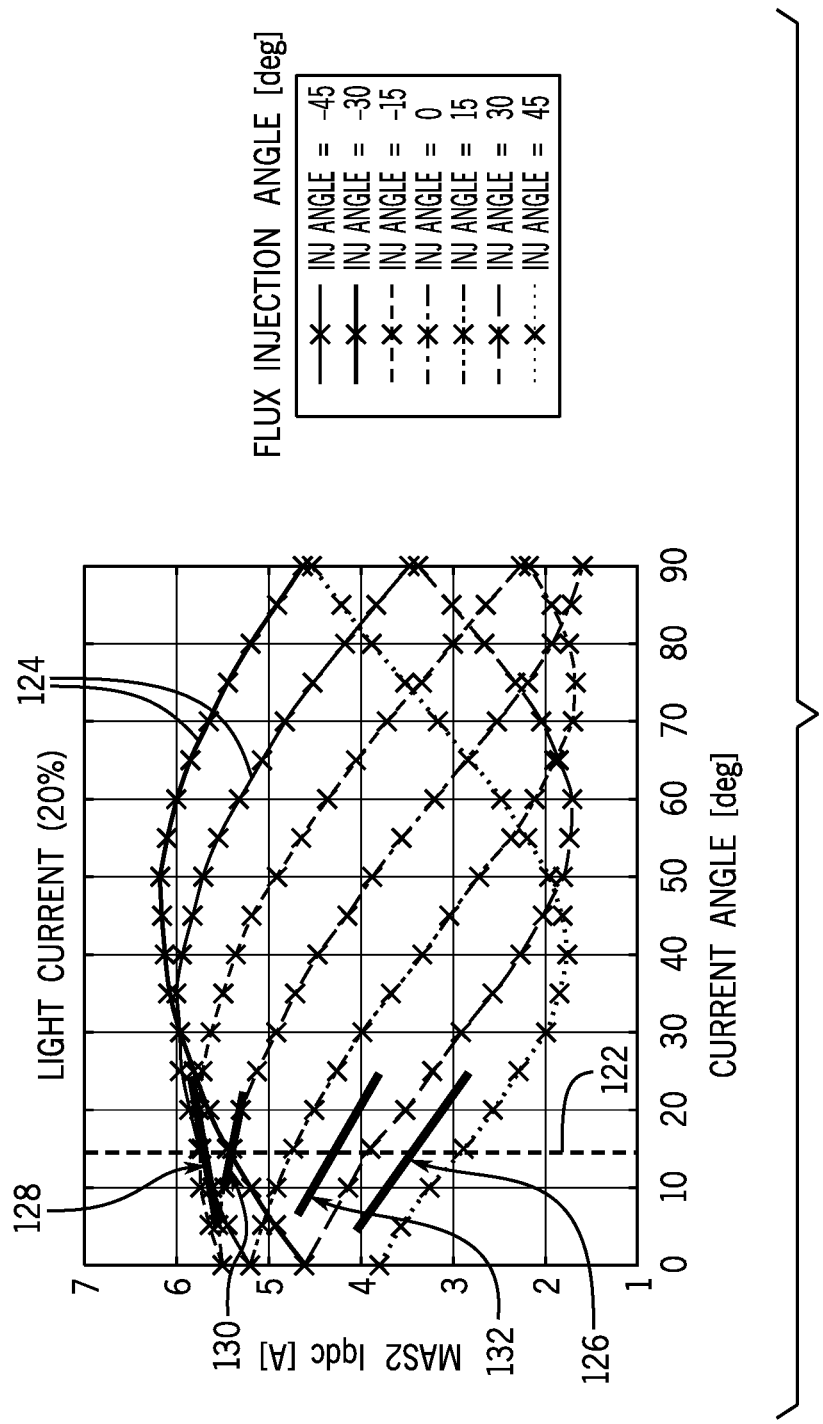
FIGS. 20A and 20B are graphs illustrating a correlation between modifying the injection angle of a voltage carrier signal to minimize noise and its effect on the magnetic alignment signature that is measured to provide self-sensing of the electric motor for light current and full current operating modes, respectively.
Figure 20B:
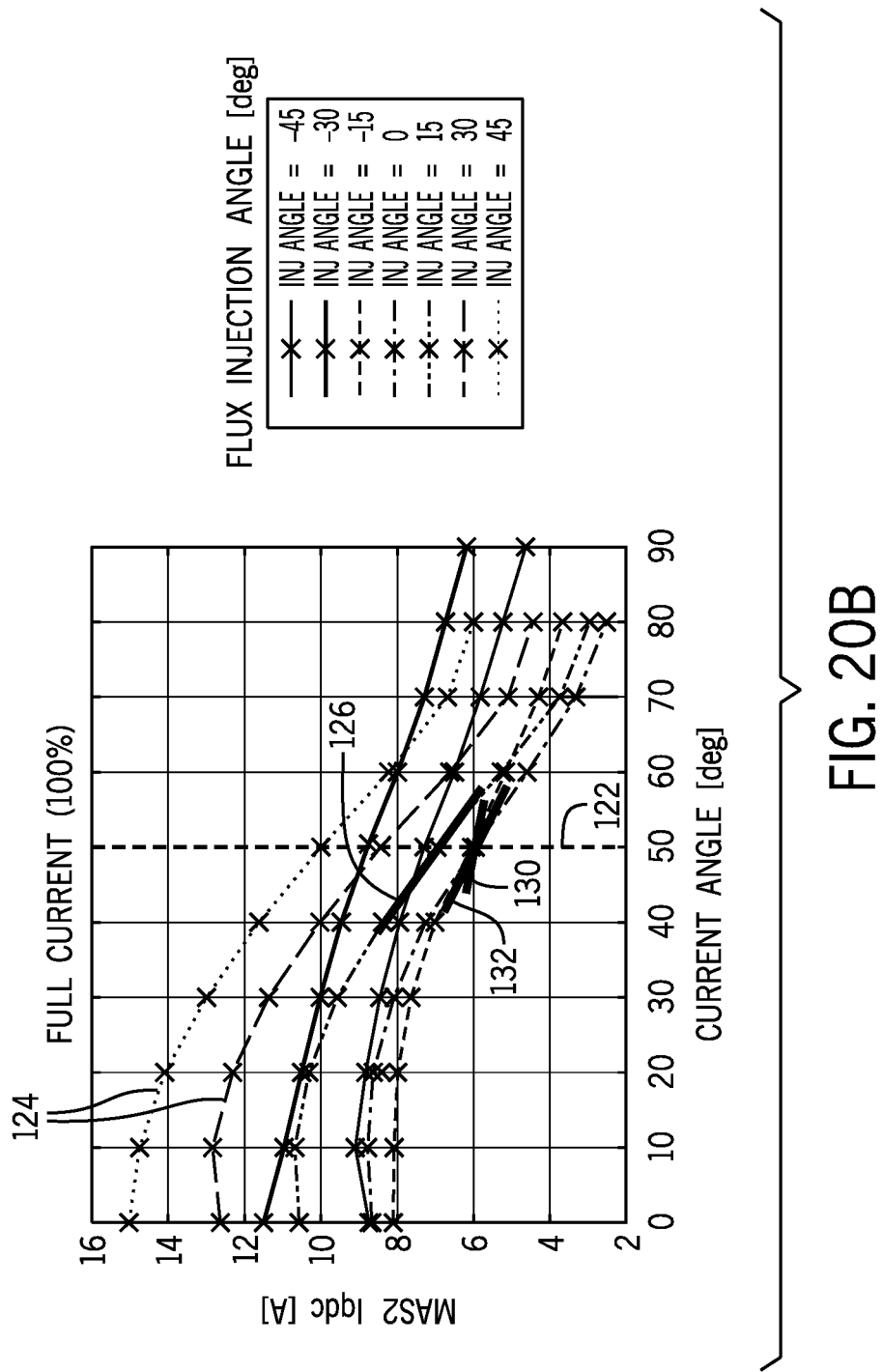

FIGS. 20A and 20B illustrate the correlation between adjusting the injection angle of a voltage carrier signal to reduce noise and its effect on the magnetic alignment signature that is measured to provide self-sensing of the electric motor, with FIGS. 20A and 20B illustrating such correlation for light current and full current operating modes. The magnetic alignment signatures are desired to have strong monotonous sensitivity to current angle on and around the desired operating current angle (i.e., of the primary excitation current vector) of the electric machine, such as the maximum torque per ampere (MTPA) current angle indicated at 122, as a wide monotonous sensitivity range provides stronger dynamic robustness to disturbances.

Referring first to the light current operating mode in FIG. 20A, a desired MTPA current angle 122 at which to operate the machine is illustrated, along with plots 124 of various flux injection angles (from −45° to 45°, at 15° increments). Also shown are lines illustrating a constant torque injection 126, constant flux injection 128, an uncompensated injection 130 between the constant torque and constant flux injections 126, 128, and a minimum noise injection 132 between the constant torque and constant flux injections. As can be seen, the minimum noise injection orientation 132 is between 20° and 25° and provides a strong magnetic alignment sensitivity. That is, for the illustrated light torque operation, a better magnetic alignment sensitivity is actually achieved at the minimum noise injection orientation 132 as compared to orientations such as the constant flux orientation 128 or tangential voltage (no-compensation) orientation 130. Thus, an improved self-sensing control performance is achieved while the noise is minimized. Referring now to the full current operating mode in FIG. 20B, it is seen that, at the desired MTPA current angle 122, there is very little difference between the minimum noise injection orientation 132, the constant torque injection orientation, 126 and the uncompensated injection 130. The minimum noise injection orientation 132 is between 0° and −15° and is very close to the orientation of an uncompensated injection 130.

Thus, as can be seen in FIGS. 20A and 20B, profiling the orientation/angle of the signal injection to achieve noise minimization can be done without significantly affecting magnetic alignment sensitivity. A base level of sensitivity to the magnetic alignment signature can be maintained at an angle/orientation of the carrier signal injection corresponding to the noise minimization, so as to provide for sensorless control of the AC electric machine by controlling an orientation of the current vector using the magnetic alignment signature—with a level of 3-6 MAS2 Iqdc [A] being maintained at light current operation and a level of 6-10 MAS2 Iqdc [A] being maintained at full current operation, as shown in FIGS. 20A and 20B.

It is to be understood that the signature extraction can be done in any frame and the orientation can be selected (i.e., profiled) to improve the sensitivity of the magnetic alignment signature. In the above example, only the signature MAS2 ($I_{qdc}$) is shown, which is extraction frame independent, but the signature MAS1 ($I_{dc}$) or ($I_{qc}$) may be used and have improved sensitivity with an adjusted extraction frame.

Figure 21:
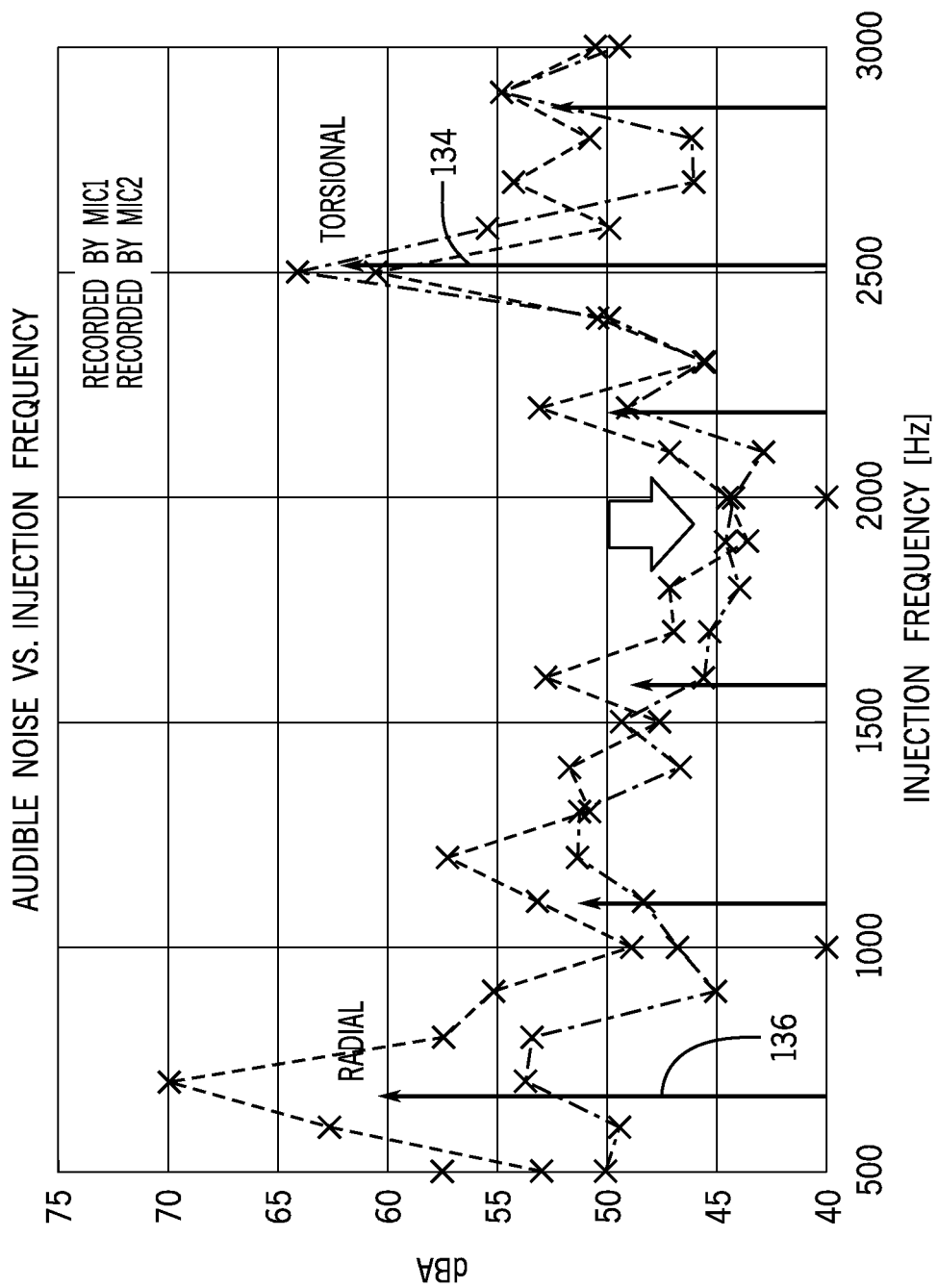
FIG. 21 is a graph illustrating torsional and radial resonance modes for an AC electric machine relative to the frequency of a carrier signal injection that is to be provided for self-sensing of the AC electric machine.

According to one embodiment of the invention, it is recognized that injection of the high frequency carrier signal may be (further) modified based on the proximity thereof to a resonant mode of the electric machine—i.e., a torsional resonance or radial resonance point. That is, if a frequency of the carrier signal injection that is to be provided for optimal sensorless control of the electric motor is determined to be near/proximate torsional resonance (e.g., within 100 Hz), then the orientation/angle of the carrier injection may be modified (e.g., rotated +/−0° to 5°) to be closer to the torque contour to achieve minimum noise generation. Conversely, if a frequency of the carrier signal injection that is to be provided for optimal sensorless control of the electric motor is determined to be near/proximate radial resonance (e.g., within 100 Hz), then the orientation/angle of the carrier injection may be modified (e.g., rotated +/−0° to 5°) to be closer to the flux contour to achieve minimum noise generation. An illustration of such torsional and radial resonance modes for an electric machine is illustrated in FIG. 21, where frequency of the injection current is swept. As can be seen therein, torsional resonance 134 is present for the illustrated electric machine at 2.5 kHz, while radial resonance 136 is present at 0.7 kHz, as well as 1.1 kHz, 1.6 kHz, 2.2 kHz, and 2.8 kHz (although the noised is not as salient as at 0.7 kHz), with it being recognized that these resonance frequencies can vary between electric machines. Determination of the resonant mode characteristics of the electric machine can be performed at design stage or during in-situ. Various sensors can be used to help determine the resonance modes (e.g., sensors inside the cabin), with such sensors being used to monitor noise or vibration caused by high frequency injection and provide feedback. Additionally, routine noise tests can be performed to evaluate noise propagation paths.

Figure 22A:
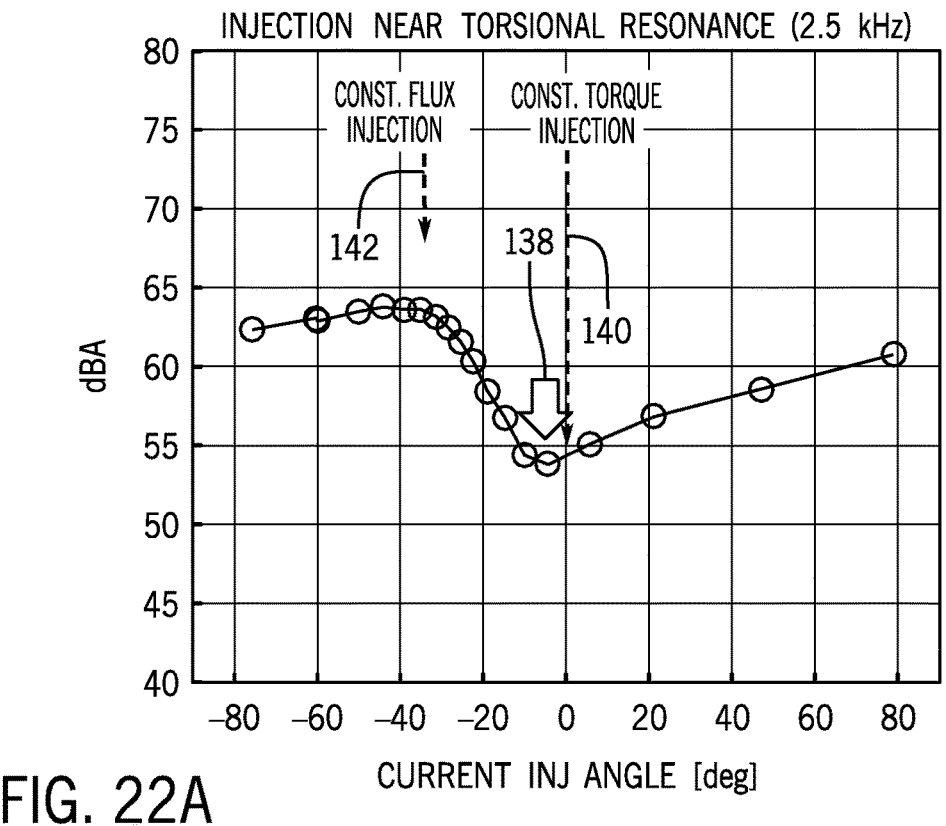
FIGS. 22A and 22B are graphs illustrating injection of a carrier signal near a constant torque contour orientation at a frequency near torsional resonance and injection of a carrier signal near a constant flux contour orientation at a frequency near radial resonance, respectively, to achieve noise minimization, according to an embodiment of the invention.
Figure 22B:
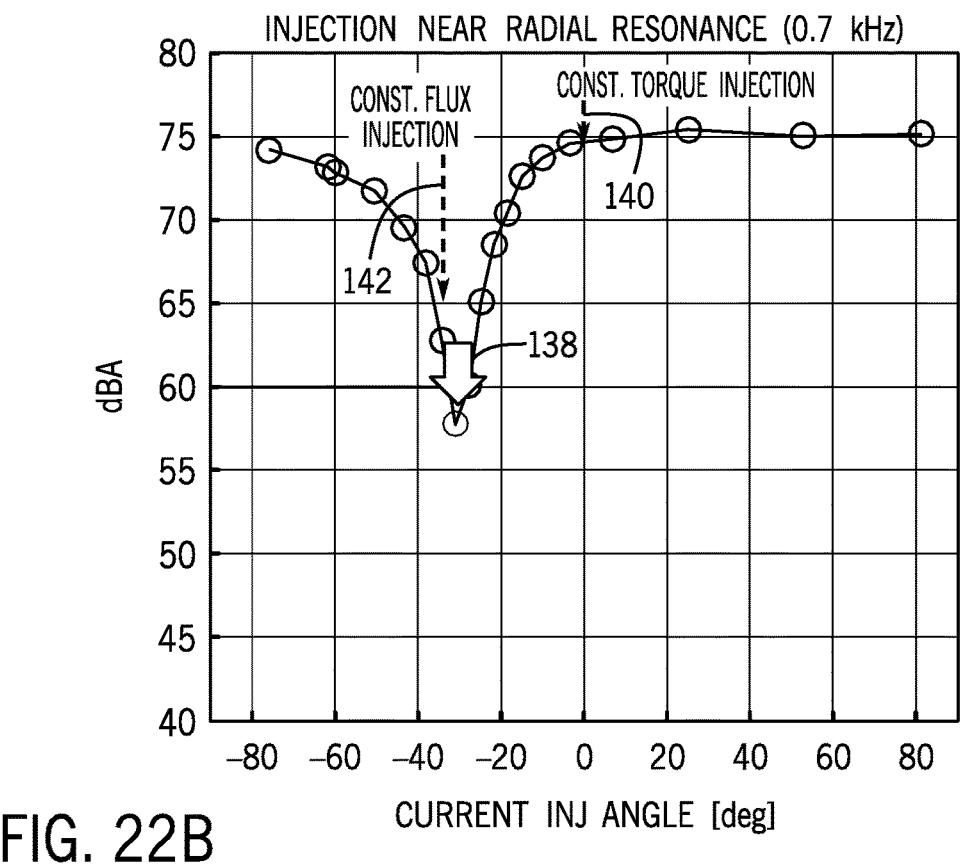

FIGS. 22A and 22B illustrate injection of a carrier signal near the constant torque contour and the constant flux contour in order to achieve noise minimization. As shown in FIG. 22A, if the injection frequency is near torsional resonance (here 2.5 kHz), then a minimum noise injection angle 138 is near the constant torque angle/contour 140—as compared to a midpoint between the constant flux contour 140 and the constant torque contour 142 orientations, as would be the case if the injection frequency was not near the torsional resonance. As shown in FIG. 22B, if the injection frequency is near radial resonance (here 0.7 kHz), then a minimum noise injection angle 138 is near the constant flux angle/contour 142—as compared to a midpoint between the constant flux contour 142 and the constant torque contour 140 orientations, as would be the case if the injection frequency was not near the radial resonance. In the illustrated examples, a reduction of approximately 4-5 dB may be achieved with an injection angle near the torque contour for a frequency proximate the torsional resonance (FIG. 22A) and a reduction of approximately 13 dB may be achieved with an injection angle near the flux contour for a frequency proximate the radial resonance (FIG. 22B).

According to one embodiment, it is further recognized that—in addition to or alternative to altering an angle/orientation of carrier signal injection—the frequency of the injected carrier signal can be altered to minimize noise and/or vibration in the electric machine. That is, the injection frequency could be reduced so as to be below an undesired frequency range, such as the audible range or near vibration modes, which is (for example) enabled due to the reduced filtering demand for the magnetic alignment signature at or near no load condition. Conversely, the injection frequency could be increased so as to be above an undesired frequency range, such as the audible range or near vibration modes. With respect to such increasing/decreasing of the frequency of the injected carrier signal, it is recognized that such altering of the frequency is restricted based on the impact of such frequency altering on the dynamic performance of the self-sensing.

Figure 23:
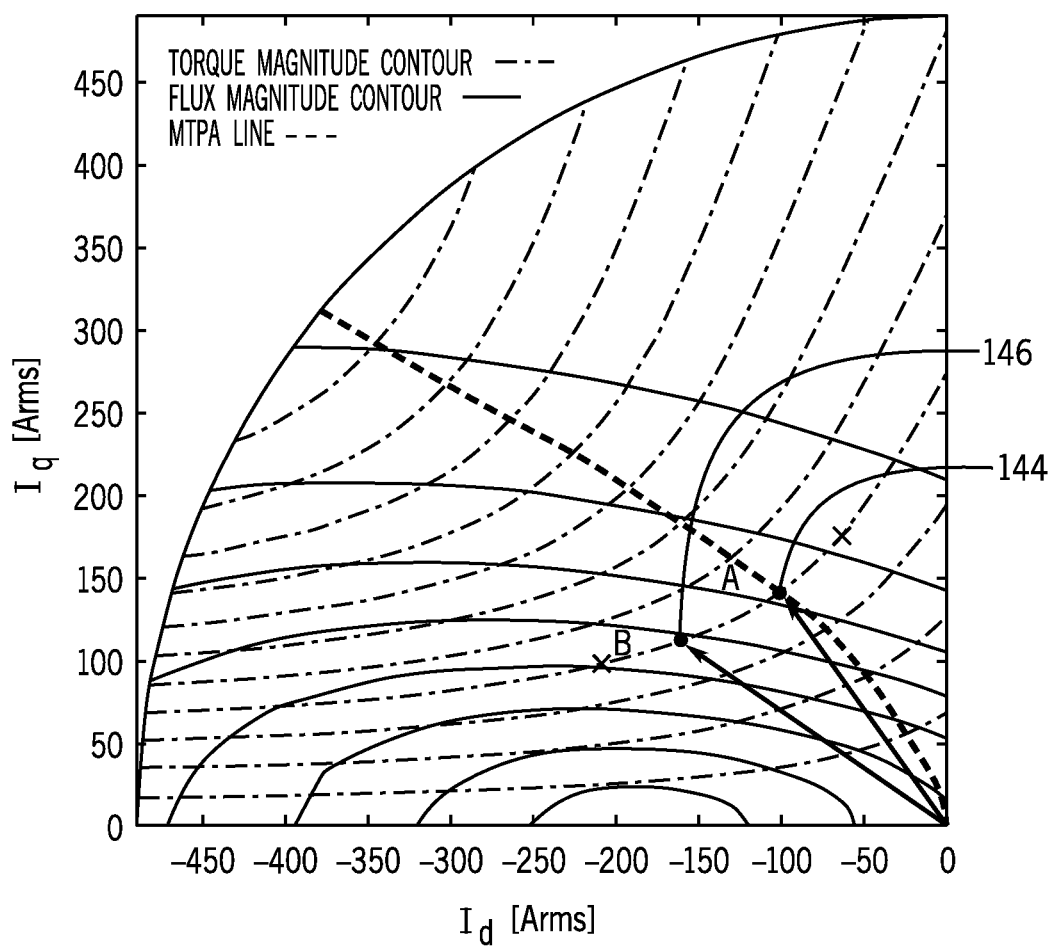
FIG. 23 is a graph illustrating modification of an operating point of an AC electric machine to reduce both radial excitation and torsional excitation and lower overall noise, according to an embodiment of the invention.

According to another embodiment of the invention, rather than modifying the orientation/frequency of the carrier signal injection, the operating point of the electric machine could instead be modified in order to reduce noise and/or vibration thereof. That is, the operating point of the electric machine could be modified so that both radial excitation as well as the torsional excitation can be reduced to reduce the overall sound/vibration generation. An example of modifying the operating point of the electric machine is illustrated in FIG. 23, where the operating point is moved from a point A (indicated at 144) to a point B (indicated at 146)—i.e., a magnitude and/or angle of the current vector is modified—so that both radial excitation as well as the torsional excitation can be reduced to reduce the overall sound generation. As shown, the operating point 144, 146 is moved so as to stay along the same torque contour, but has a different operating current and current angle γ.

Figure 24A:
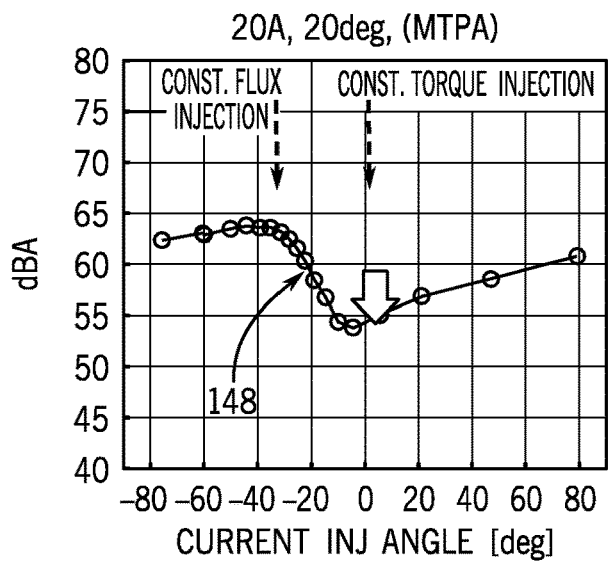
FIGS. 24A-24C are graphs illustrating noise levels associated with operation of an AC electric machine at different operating points and with injection of a high frequency voltage near torsional resonance.
Figure 24B:
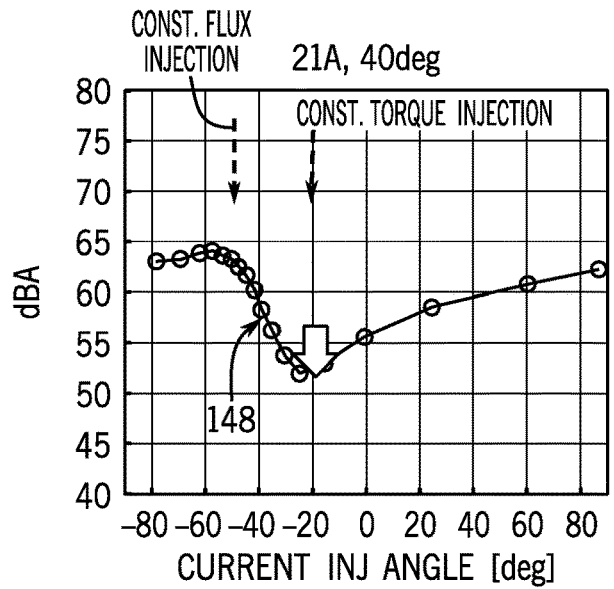
Figure 24C:
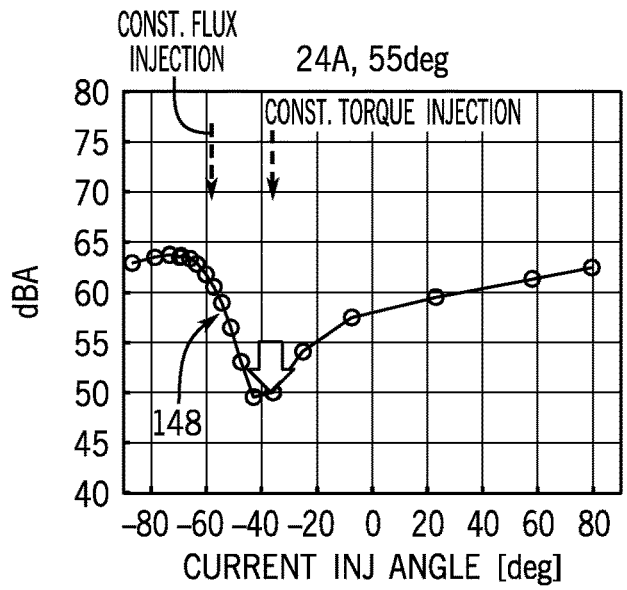

Referring now to FIGS. 24A-24C, an illustration is provided of the noise reduction achievable from operation of the electric machine at different operating points along a constant torque contour—with a high frequency voltage injection being applied near torsional resonance at 32V and 2.5 kHz. Operation of the machine at 20A and a MTPA current angle of 20° (FIG. 24A), at 21A and a MTPA current angle of 40° (FIG. 24B), and at 24A and a MTPA current angle of 55° (FIG. 24C) are provided as examples. As can be seen, the minimum achievable noise level 148 decreases from 55 dB at the operating point of FIG. 24A, to 53 dB at the operating point of FIG. 24B, and to 50 dB at the operating point of FIG. 24C.

Figure 25A:
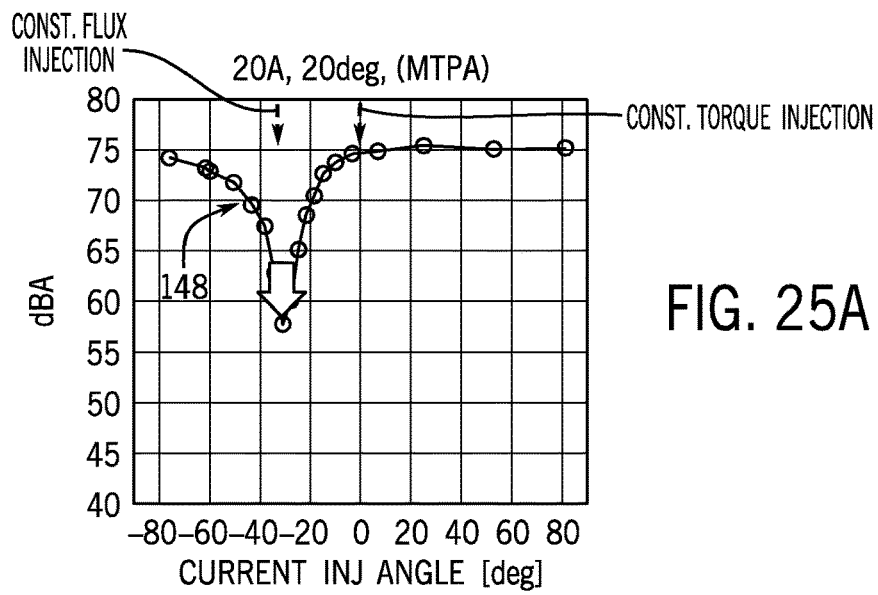
FIGS. 25A-25C are graphs illustrating noise levels associated with operation of an AC electric machine at different operating points and with injection of a high frequency voltage near radial resonance.
Figure 25B:
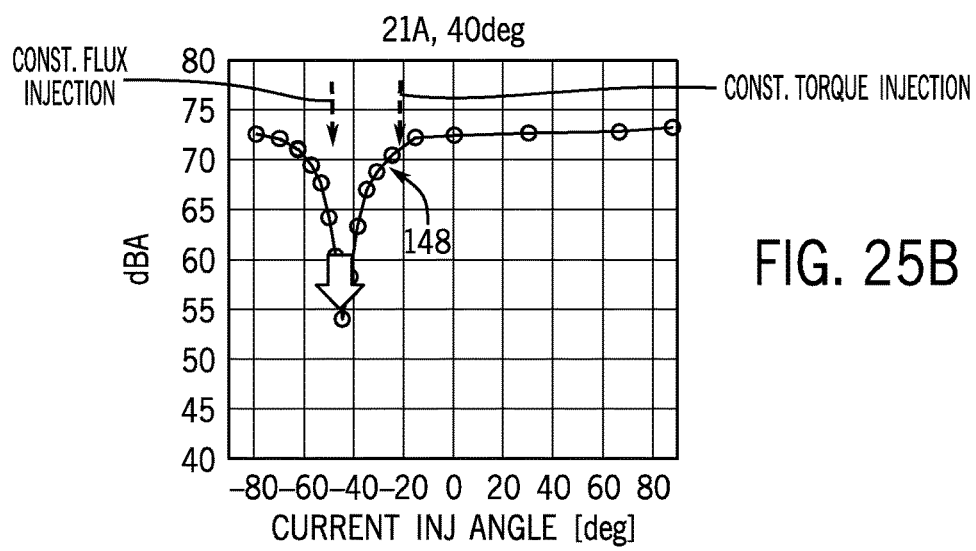
Figure 25C:
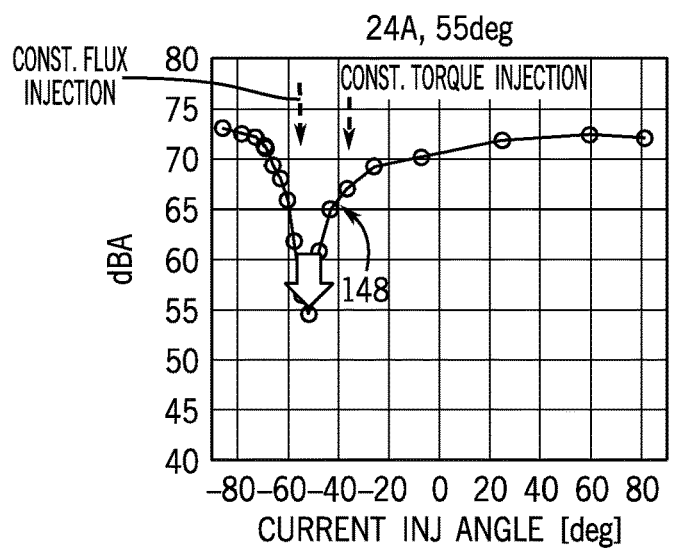

FIGS. 25A-25C provide an illustration of the noise reduction achievable from operation of the electric machine at different operating points along a constant flux contour—with a high frequency voltage injection being applied near radial resonance at 8.8V and 700 Hz. Operation of the machine at 20A and a MTPA current angle of 20° (FIG. 25A), at 21A and a MTPA current angle of 40° (FIG. 25B), and at 24A and a MTPA current angle of 55° (FIG. 25C) are provided as examples. As can be seen, the minimum achievable noise level 148 decreases from 58 dB at the operating point of FIG. 25A, to 54 dB at the operating point of FIG. 25B, and to 54 dB at the operating point of FIG. 25C.

It is thus recognized that the operating point of the electric machine may be modified so that both radial excitation as well as the torsional excitation can be reduced to reduce the overall sound generation. While it is recognized that modifying the operating point may result in a larger current or larger operating point loss—thereby sacrificing efficiency slightly—such impacts could be manageable or negligible, especially for the light load operation, where loss is insignificant.

Beneficially, embodiments of the invention thus provide a system and method for self-sensing control of an electric machine that utilizes high frequency carrier signal injection, with the carrier signal injection being controlled to reduce or minimize noise and vibration in the electric machine. The injection of the high frequency carrier signal (i.e., the orientation and/or excitation frequency) may be manipulated or modified in order to minimize undesired noise and vibration resulting from the carrier signal, while still providing for desired self-sensing performance by generating a magnetic alignment signature of sufficient strength and sensitivity to allow for self-sensing control of the electric machine.

A technical contribution of the present invention is that it provides a controller implemented technique for position estimation and self-sensing control for an AC electric machine at reduced noise and vibration levels. The technique controls an orientation and/or frequency of a high frequency carrier signal injected onto the primary excitation current vector in order to minimize undesired noise and vibration resulting from the carrier signal, while still providing for desired self-sensing performance by generating a magnetic alignment signature of sufficient strength and sensitivity to allow for self-sensing control of the electric machine.

Therefore, according to one embodiment of the invention, a drive system for driving an AC electric machine includes an electric machine power converter configured to provide a primary current excitation to drive the AC electric machine and inject a carrier signal to the AC electric machine, the primary current excitation comprising a current vector having a magnitude and angle. The drive system also includes a control system separate from or incorporated into the electric machine power converter, the control system commanding the power converter to inject a carrier signal to the AC electric machine that is superimposed onto the current vector, where the carrier signal generates a carrier response signal that has sensitivity to magnetic alignment information of the AC electric machine at its operating point, with the carrier response signal providing a measurable magnetic alignment signature of the AC electric machine. In injecting the carrier signal, the control system commands the power converter to inject the carrier signal at an injection angle between a constant flux injection angle and a constant torque injection angle, so as to reduce at least one of noise and vibration of the AC electric machine caused by the injected carrier signal.

According to another embodiment of the invention, a method for reducing a noise level of an AC electric machine is provided. The method includes causing a drive system to generate a primary current excitation to drive the AC electric machine, the primary current excitation comprising a current vector having a current magnitude and current angle and causing the drive system to superimpose a high-frequency carrier voltage or current onto the current vector to generate a selected carrier response current or voltage, respectively, that has sensitivity to magnetic alignment information of the AC electric machine. Causing the drive system to superimpose the high-frequency carrier voltage or current further comprises injecting the high-frequency carrier voltage or current at an orientation between a constant torque injection orientation and a constant flux injection orientation, so as to reduce the noise level of the AC electric machine below noise levels corresponding to injection of the high-frequency carrier voltage or current at the constant torque injection orientation and the constant flux injection orientation.

According to yet another embodiment of the invention, a drive system for driving an AC electric machine includes an electric machine power converter configured to generate a primary excitation current vector to drive the AC electric machine and inject a carrier signal onto the primary excitation current vector, the primary excitation current vector having a current magnitude and current angle. The drive system also includes a control system configured to cause the power converter to inject a carrier signal onto the primary excitation current vector, the carrier signal comprising one of a carrier voltage and a carrier current that is superimposed on the primary excitation current vector. The control system is also configured to measure at least one magnetic alignment signature of the AC electric machine that is derived from a carrier response signal generated from the injected carrier signal and control an orientation of the primary excitation current vector using the measured at least one magnetic alignment signature to operate the AC electric machine. In causing the power converter to inject the carrier signal, the control system is further configured to control at least one of an angle and frequency of the carrier signal to maintain a noise level associated with operation of the AC electric machine at less than a pre-determined decibel level.

According to still another embodiment of the invention, a drive system for driving an AC electric machine includes an electric machine power converter configured to provide a primary current excitation to drive the AC electric machine and inject a carrier signal to the AC electric machine, the primary current excitation comprising a current vector having a magnitude and angle. The drive system also includes a control system separate from or incorporated into the electric machine power converter, the control system commanding the power converter to inject the carrier signal to the AC electric machine that is superimposed onto the current vector, where the carrier signal generates a carrier response signal that has sensitivity to magnetic alignment information of the AC electric machine at its operating point, with the carrier response signal providing a measurable magnetic alignment signature of the AC electric machine. In commanding the power converter to inject the carrier signal, the drive system is configured to determine an injection angle that minimizes at least one of noise and vibration of the AC electric machine caused by the injected carrier signal and command the power converter to inject the carrier signal at the injection angle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A drive system for driving an AC electric machine, the drive system comprising:
    an electric machine power converter configured to provide a primary current excitation to drive the AC electric machine and inject a carrier signal to the AC electric machine, the primary current excitation comprising a current vector having a magnitude and angle; and
    a control system separate from or incorporated into the electric machine power converter, the control system commanding the power converter to inject the carrier signal to the AC electric machine that is superimposed onto the current vector, where the carrier signal generates a carrier response signal that has sensitivity to magnetic alignment information of the AC electric machine at its operating point, with the carrier response signal providing a measurable magnetic alignment signature of the AC electric machine;
    wherein, in injecting the carrier signal, the control system commands the power converter to inject the carrier signal at an injection angle between a constant flux injection angle and a constant torque injection angle, so as to reduce at least one of noise and vibration of the AC electric machine caused by the injected carrier signal.

2. The drive system of claim 1 wherein the injection angle of the carrier signal that minimizes the at least one of the noise and vibration is between a constant torque injection angle and a constant flux injection angle.

3. The drive system of claim 2 wherein the injection angle of the carrier signal that minimizes the at least one of the noise and vibration is at an angle midway between the constant torque injection angle and the constant flux injection angle.

4. The drive system of claim 1 wherein the control system is configured to:
    determine a proximity of a frequency of the injected carrier signal to a torsional resonance frequency and radial resonance frequency of the AC electric machine; and
    profile the injection angle and/or frequency of the carrier signal based on the proximity.

5. The drive system of claim 4 wherein, if the frequency of the injected carrier signal is proximate to the torsional resonance frequency, the control system is configured to orient the injection angle of the carrier signal injected by the power converter closer to the constant torque injection angle.

6. The drive system of claim 4 wherein, if the frequency of the injected carrier signal is proximate to the radial resonance frequency, the control system is configured to orient the injection angle of the carrier signal injected by the power converter closer to the constant flux injection angle.

7. The drive system of claim 4 wherein the control system is configured to modify the frequency of the carrier signal injected by the power converter to distance the frequency of the injected carrier signal from the torsional resonance frequency and the radial resonance frequency of the AC electric machine.

8. The drive system of claim 1 wherein the current vector drives the AC electric machine at an operating point resulting from the magnitude and angle of the current vector, and wherein the drive system is configured to modify the operating point to reduce at least one of torsional excitation and radial excitation of the AC electric machine, so as to reduce noise of the AC electric machine.

9. The drive system of claim 1 wherein, in injecting the carrier signal, the control system commands the power converter to inject a pulsating high frequency voltage signal or current signal.

10. The drive system of claim 1 wherein injection of the carrier signal at the injection angle provides at least a base level of sensitivity to the magnetic alignment signature, so as to provide for sensorless control of the AC electric machine by controlling an orientation of the current vector using the magnetic alignment signature.

11. A method for reducing a noise level of an AC electric machine, the method comprising:
   causing a drive system to generate a primary current excitation to drive the AC electric machine, the primary current excitation comprising a current vector having a current magnitude and current angle; and
   causing the drive system to superimpose a high-frequency carrier voltage or current onto the current vector to generate a selected carrier response current or voltage, respectively, that has sensitivity to magnetic alignment information of the AC electric machine;
   wherein causing the drive system to superimpose the high-frequency carrier voltage or current further comprises injecting the high-frequency carrier voltage or current at an orientation between a constant torque injection orientation and a constant flux injection orientation, so as to reduce the noise and/or vibration level of the AC electric machine below noise and/or vibration levels corresponding to injection of the high-frequency carrier voltage or current at the constant torque injection orientation and the constant flux injection orientation.

12. The method of claim 11 wherein injecting the high-frequency carrier voltage or current comprises injecting the high-frequency carrier voltage or current at an orientation midway between the constant torque injection orientation and the constant flux injection orientation.

13. The method of claim 11 further comprising causing the drive system to determine a proximity of a frequency of the injected carrier signal to a torsional resonance frequency and radial resonance frequency of the AC electric machine.

14. The method of claim 13 further comprising:
   causing the drive system to orient the high-frequency carrier voltage or current closer to the constant torque injection orientation if the frequency of the high-frequency carrier voltage or current is proximate to the torsional resonance frequency; or
   causing the drive system to orient the high-frequency carrier voltage or current closer to the constant flux injection orientation if the frequency of the high-frequency carrier voltage or current is proximate to the radial resonance frequency.

15. The method of claim 13 further comprising causing the drive system to modify the frequency of the high-frequency carrier voltage or current to distance the frequency of the high-frequency carrier voltage or current from the torsional resonance frequency and the radial resonance frequency of the AC electric machine.

16. The method of claim 11 further comprising causing the drive system to modify the current magnitude and/or current angle of the current vector to reduce at least one of torsional excitation and radial excitation of the AC electric machine, so as to reduce noise and/or vibration of the AC electric machine.

17. The method of claim 11 wherein the orientation of the injected high-frequency carrier voltage or current is dynamically adjusted during operation of the AC electric machine.

18. A drive system for driving an AC electric machine, the drive system comprising:
   an electric machine power converter configured to generate a primary excitation current vector to drive the AC electric machine and inject a carrier signal onto the primary excitation current vector, the primary excitation current vector having a current magnitude and current angle; and
   a control system configured to:
      cause the power converter to inject the carrier signal onto the primary excitation current vector, the carrier signal comprising one of a carrier voltage and a carrier current that is superimposed on the primary excitation current vector;
      measure at least one magnetic alignment signature of the AC electric machine that is derived from a carrier response signal generated from the injected carrier signal; and
      control an orientation of the primary excitation current vector using the measured at least one magnetic alignment signature to operate the AC electric machine;
   wherein, in causing the power converter to inject the carrier signal, the control system is further configured to control at least one of an angle and frequency of the carrier signal to maintain a noise level associated with operation of the AC electric machine at less than a pre-determined decibel level.

19. The drive system of claim 18 wherein, in controlling the at least one of the angle and frequency of the carrier signal, the control system is configured to cause the power converter to inject the carrier signal at an angle between a constant torque injection angle and a constant flux injection angle.

20. The drive system of claim 19 wherein the control system is configured to:
   orient the injection angle of the carrier signal injected by the power converter near to the constant torque injection angle if the frequency of the injected carrier signal is proximate to a torsional resonance frequency of the AC electric machine; and
   orient the injection angle of the carrier signal injected by the power converter near to the constant flux injection angle if the frequency of the injected carrier signal is proximate to a radial resonance frequency of the AC electric machine.

21. The drive system of claim 18 wherein the control system is configured to modify the frequency of the carrier signal injected by the power converter to distance the frequency of the carrier signal from a torsional resonance frequency and a radial resonance frequency of the AC electric machine.

22. The drive system of claim 18 wherein the control system is configured to modify the current magnitude and/or current angle of the primary excitation current vector to reduce at least one of torsional excitation and radial excitation of the AC electric machine, so as to reduce noise of the AC electric machine.

23. A drive system for driving an AC electric machine, the drive system comprising:

an electric machine power converter configured to provide a primary current excitation to drive the AC electric machine and inject a carrier signal to the AC electric machine, the primary current excitation comprising a current vector having a magnitude and angle; and a control system separate from or incorporated into the electric machine power converter, the control system commanding the power converter to inject the carrier signal to the AC electric machine that is superimposed onto the current vector, where the carrier signal generates a carrier response signal that has sensitivity to magnetic alignment information of the AC electric machine at its operating point, with the carrier response signal providing a measurable magnetic alignment signature of the AC electric machine;

wherein, in commanding the power converter to inject the carrier signal, the drive system is configured to:

determine an injection angle that minimizes at least one of noise and vibration of the AC electric machine caused by the injected carrier signal; and command the power converter to inject the carrier signal at the injection angle.

* * * * *